US012689555B2

(12) United States Patent
MacLennan

(10) Patent No.: US 12,689,555 B2
(45) Date of Patent: Jul. 21, 2026

(54) SINGLE PANE POLICY AND DAY ONE CONFIGURATION

(71) Applicant: Cisco Technology, Inc., San Jose, CA (US)

(72) Inventor: Ryan MacLennan, Durham, NC (US)

(73) Assignee: Cisco Technology, Inc., San Jose, CA (US)

( * ) Notice: Subject to any disclaimer, the term of this patent is extended or adjusted under 35 U.S.C. 154(b) by 394 days.

(21) Appl. No.: 18/402,197

(22) Filed: Jan. 2, 2024

(65) Prior Publication Data

US 2025/0219904 A1 Jul. 3, 2025

(51) Int. Cl.
G06F 40/40 (2020.01)
H04L 41/082 (2022.01)

(52) U.S. Cl.
CPC ............ H04L 41/082 (2013.01); G06F 40/40 (2020.01)

(58) Field of Classification Search
CPC ............................... H04L 41/082; G06F 40/40
See application file for complete search history.

(56) References Cited

U.S. PATENT DOCUMENTS

| | | | |
|---|---|---|---|
| 11,044,179 B1 | 6/2021 | Bettaiah et al. | |
| 2007/0058570 A1 | 3/2007 | Singh et al. | |
| 2022/0094614 A1* | 3/2022 | Khurshid | H04L 41/147 |
| 2023/0208701 A1* | 6/2023 | R | H04L 41/0636 |
| | | | 709/224 |

FOREIGN PATENT DOCUMENTS

CN 116346574 A 6/2023

* cited by examiner

*Primary Examiner* — Suraj M Joshi
(74) *Attorney, Agent, or Firm* — Polsinelli P.C.

(57) ABSTRACT

A method is described that involves receiving configuration information from one or more network services within a network. This information includes configuration descriptions of rules which are configured on the respective services. The method then analyzes the configuration information for the network services and presents identified rules on the respective services that have similar intents together in a group within a user interface. If an input is received to expand the group, the method presents similar rules proximate to the group with a suggestion to modify the similar rule to correspond to the identified rules. The method then determines a configuration update for the network service on which the similar rule is configured to apply a change to the similar rule, making it correspond to the identified rules. The method can then transmit the configuration updates to each of the network services within the network.

20 Claims, 18 Drawing Sheets

ENCODE BLOCK <u>322a</u>

DECODE BLOCK <u>330a</u>

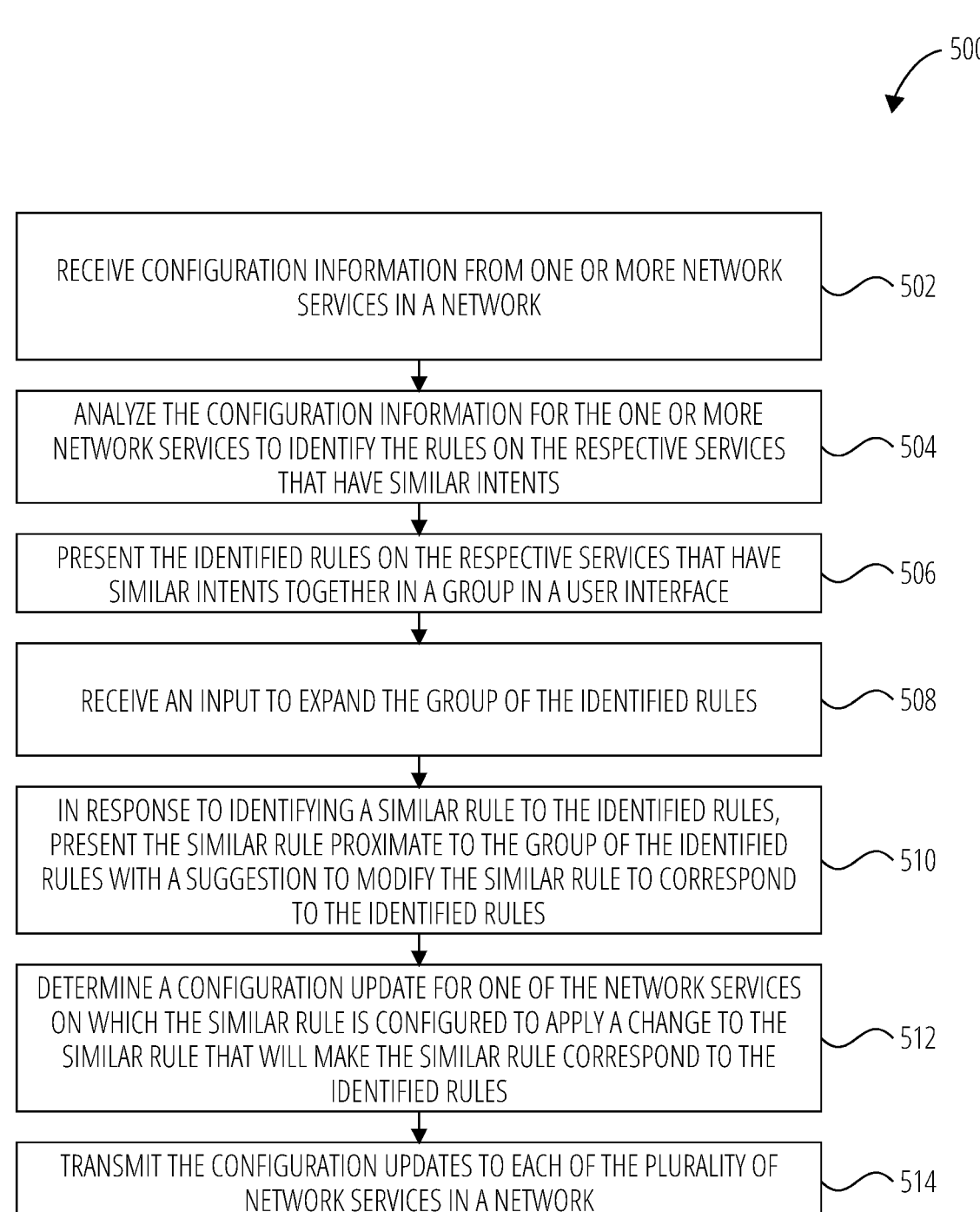

RECEIVE CONFIGURATION INFORMATION FROM ONE OR MORE NETWORK SERVICES IN A NETWORK ⟋502

ANALYZE THE CONFIGURATION INFORMATION FOR THE ONE OR MORE NETWORK SERVICES TO IDENTIFY THE RULES ON THE RESPECTIVE SERVICES THAT HAVE SIMILAR INTENTS ⟋504

PRESENT THE IDENTIFIED RULES ON THE RESPECTIVE SERVICES THAT HAVE SIMILAR INTENTS TOGETHER IN A GROUP IN A USER INTERFACE ⟋506

RECEIVE AN INPUT TO EXPAND THE GROUP OF THE IDENTIFIED RULES ⟋508

IN RESPONSE TO IDENTIFYING A SIMILAR RULE TO THE IDENTIFIED RULES, PRESENT THE SIMILAR RULE PROXIMATE TO THE GROUP OF THE IDENTIFIED RULES WITH A SUGGESTION TO MODIFY THE SIMILAR RULE TO CORRESPOND TO THE IDENTIFIED RULES ⟋510

DETERMINE A CONFIGURATION UPDATE FOR ONE OF THE NETWORK SERVICES ON WHICH THE SIMILAR RULE IS CONFIGURED TO APPLY A CHANGE TO THE SIMILAR RULE THAT WILL MAKE THE SIMILAR RULE CORRESPOND TO THE IDENTIFIED RULES ⟋512

TRANSMIT THE CONFIGURATION UPDATES TO EACH OF THE PLURALITY OF NETWORK SERVICES IN A NETWORK ⟋514

FIG. 5

SINGLE PANE POLICY AND DAY ONE CONFIGURATION

FIELD OF THE TECHNOLOGY

The present technology relates to the field of network communication and routing technologies addressing configurations across multiple network devices and services. Specifically, the proposed technology relates to methods to determine configuration correlations of a plurality of network services in an information technology (IT) infrastructure.

BACKGROUND

In enterprise networking, maintaining network performance and cybersecurity are of utmost importance. To achieve this, meticulous network configurations play a critical role in fine-tuning network performance. By allocating resources such as bandwidth and processing power, network resources can be distributed efficiently among various applications and services. This allocation ensures that application-critical network functions operate seamlessly without encountering resource contention. Furthermore, network configurations assist with prioritizing Quality of Service (QOS) settings for essential services. This guarantees that applications like VOIP and video conferencing maintain consistently high performance, even during peak usage. Intelligent traffic management, facilitated by network configurations, enables load balancing, traffic shaping, and routing optimizations. This effectively mitigates bottlenecks and congestion and facilitates smooth data flow across the network.

Network configurations are also foundational to security measures. They play a vital role in enforcing access control policies that determine who can access network resources and services. These policies are highly restrictive, preventing unauthorized access and data breaches. Network configurations also include integrated firewalls and Intrusion Detection/Prevention Systems (IDS/IPS) that protect against malicious activities and known attack patterns, effectively thwarting security breaches.

Additionally, network configurations can be set up to implement a crucial configuration practice called network segmentation. This practice isolates critical assets and sensitive data within the network. In the event of a breach, attackers can be confined to a restricted network area, which minimizes their chances of lateral movement. To ensure the security of data in transit, network configurations can also integrate encryption protocols, making it unintelligible to unauthorized parties even if intercepted.

Synchronized network configurations across multiple security services are fundamental to optimizing overall network performance. When these configurations are harmonized, it ensures that resources are efficiently allocated, avoiding resource contention and bottlenecks. Proper configuration synchronization enables Quality of Service (QOS) to be uniformly applied, prioritizing essential services, and maintaining consistent performance, especially for real-time applications like VOIP and video conferencing. It also promotes intelligent traffic management, including load balancing and routing optimizations, resulting in smooth and uninterrupted data flow. Synchronized network configurations provide the foundation for a well-balanced and high-performing network, minimizing disruptions and enhancing the overall user experience.

BRIEF DESCRIPTION OF THE SEVERAL VIEWS OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which:

FIG. 5 illustrates an example process 500 to determine configuration correlations of a plurality of network services according to some aspects of the present technology.

DETAILED DESCRIPTION

Figure 1:
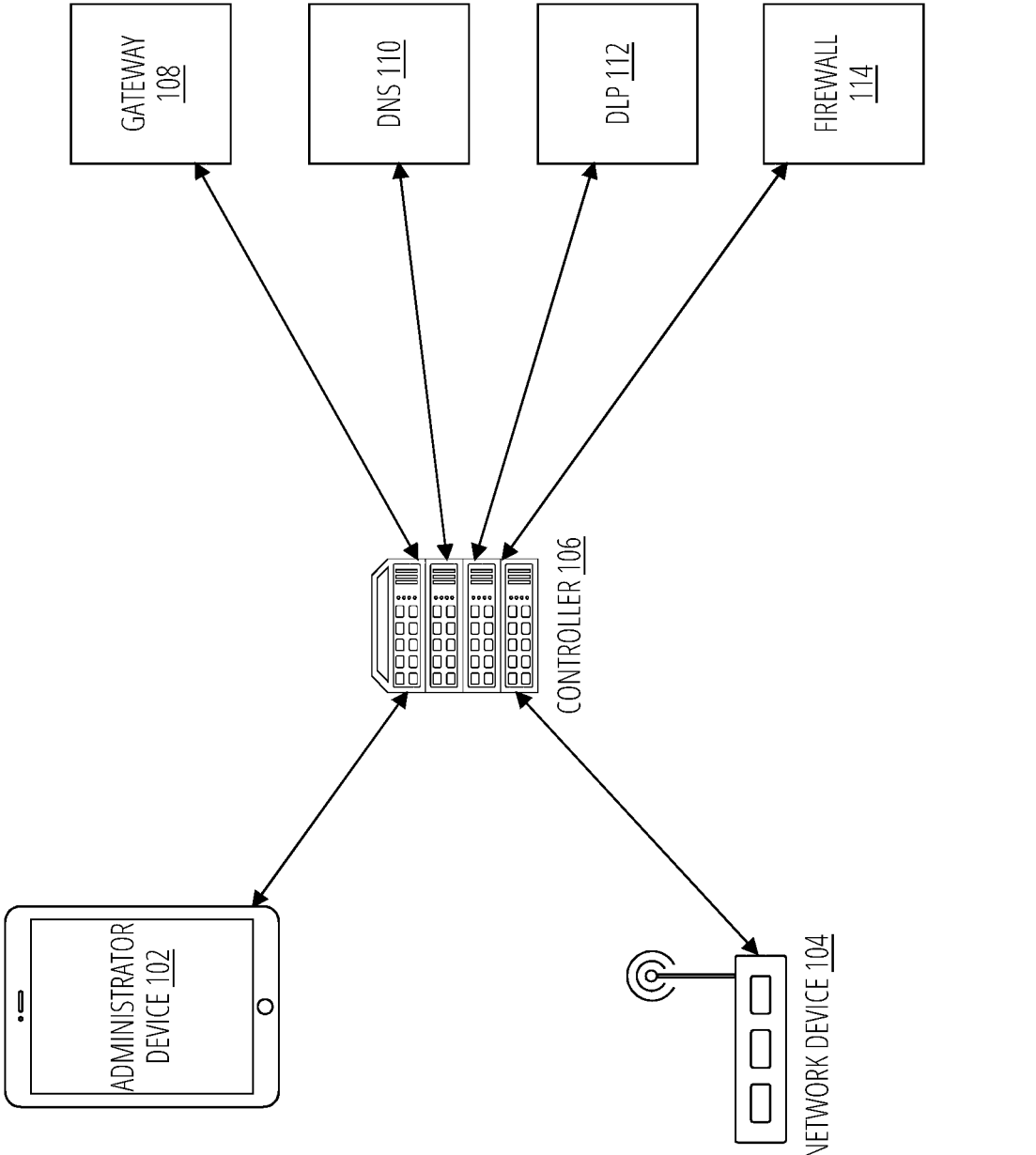
FIG. 1 illustrates a network system diagram in accordance with some embodiments of the present technology.

Various examples of the disclosure are discussed in detail below. While specific implementations are discussed, it should be understood that this is done for illustration purposes. A person skilled in the relevant art will recognize that other components and configurations can be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description. References to one or an example in the present disclosure can be references to the same example or any example; and such references mean at least one of the examples.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which can be exhibited by some embodiments and not by others.

The terms used in this specification generally have their ordinary meanings in the art, within the context of the disclosure, and in the specific context where each term is used. Alternative language and synonyms can be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative and is not intended to further limit the scope and meaning of the disclosure or of any example term. Likewise, the disclosure is not limited to various embodiments given in this specification.

Without intent to limit the scope of the disclosure, examples of instruments, apparatus, methods, and their related results according to the embodiments of the present disclosure are given below. Note that titles or subtitles can be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims or can be learned by the practice of the principles set forth herein.

Overview

The synchronization of network configurations across multiple security services is crucial for optimizing overall network performance. A harmonized configuration ensures that the network operates at the highest level of efficiency and effectiveness. One of the pivotal benefits is efficient resource allocation through the synchronization of network configurations to ensure that network resources, including bandwidth and processing power, are distributed judiciously. This allocation mitigates resource contention, a common source of network bottlenecks, and ensures that essential network functions operate with fluidity and without interruption.

Harmonizing network configurations across multiple network services within an enterprise is not only an option, but a strategic imperative. This practice is crucial for optimizing network performance, enhancing security, and streamlining network management. Through the harmonization of network configurations for the network services in the network, network resources are allocated efficiently, averting resource contention and the bottlenecks that often plague underconfigured networks. Thus, resulting in a network that operates seamlessly, offering a consistent and uninterrupted user experience.

The harmonization of network configurations further provides for consistent QoS configurations that ensures uniform QoS settings across various services and applications, critical functions, such as real-time communication, receive the priority they require. This guarantees high-quality performance, even during peak network traffic, bolstering user satisfaction. During periods of time with peak network traffic harmonization of the network configurations can also bring about intelligent traffic management, encompassing load balancing, traffic shaping, and routing optimizations. These measures facilitate the smooth and efficient flow of data, preventing congestion and ensuring a network that operates with precision.

Furthermore, effective security within a network requires the harmonization of network configurations. When security settings such as firewall rules, access control policies, and intrusion detection/prevention systems (IDS/IPS) are aligned and coordinated, organizations can create a unified and robust defense strategy. This ensures that all security measures work together, thereby strengthening the network's ability to protect against a wide range of threats. Harmonizing network configurations also helps to identify and fix vulnerabilities, enforce consistent security policies, and create a coordinated response to potential security incidents. Additionally, it streamlines security management, making it more efficient and reducing the likelihood of security gaps caused by conflicting or misconfigured settings. Essentially, harmonized network configurations form a strong security shield that safeguards the network's integrity and data assets.

By minimizing configuration conflicts and network resource issues, harmonization mitigates disruptions. A stable and reliable network reduces the risk of costly downtime, ensuring operations run without interruptions. Thus, the harmonization of network configurations leads to an optimized network that excels in performance, security, and efficiency, all contributing to a superior user experience.

In one aspect, a method to determine configuration correlations of a plurality of network services includes receiving configuration information from one or more network services in a network, the configuration information including configuration descriptions of rules configured on respective services, analyzing the configuration information for the one or more network services to identify the rules on the respective services that have similar intents. The method also includes presenting the identified rules on the respective services that have similar intents together in a group in a user interface. The method also includes receiving an input to expand the group of the identified rules, where respective rules of the identified rules are presented in a normalized manner to facilitate easy comparison, in response to identifying a similar rule to the identified rules. The method also includes presenting the similar rule proximate to the group of the identified rules with a suggestion to modify the similar rule to correspond to the identified rules. The method also includes determining a configuration update for one of the network services on which the similar rule is configured to apply a change to the similar rule that will make the similar rule correspond to the identified rules. The method also includes transmitting the configuration updates to each of the plurality of network services in a network.

In some aspects, the method may also include importing the configuration information from the plurality of network services into a unified configuration dataset, identifying correlations between the respective services that have similar intents in the group based on the unified configuration dataset, where the correlations identify similarities between the identified rules, and generating an updated configuration for display across one or more devices associated with the network services, where the updated configuration incorporate the identified correlations in a single recommendation.

In some aspects, the method may also include utilizing application programming interfaces (APIs) to retrieve a plurality of configuration policies from controllers associated with each of the plurality of network services, training a Large Language Model (LLM) to recognize and analyze rules within each configuration policy, where the LLM is configured to group a set of rules from each of the configuration policies based on one or more similarities identified, and transmitting the grouped set of rules and configuration update recommendations to each of the controllers for implementation at the respective network services.

In some aspects, the method may also include where the configuration update includes an indication of how rules included within the configuration update are configured and specifies their intended functionality and application. Other technical features may be readily apparent to one skilled in the art from the following figures, descriptions, and claims.

In some aspects, the method may also include assigning a relevance level to the configuration updates with respect to the plurality of network services, indicating a significance level of the update for each service, and transmitting the configuration updates along with the relevance levels to each of the plurality of network services in a network, where the relevance levels are associated with a context-aware implementation of configuration updates tailored to each service's requirements and priorities.

In some aspects, the method may also include evaluating the relevance levels assigned to one or more configuration updates in relation to other groups of rules, where a group of rules with a higher relevance level is considered more critical to operations of the network service, and removing at least one configuration update upon determining that there are groups of rules with higher relevance levels than another group of rules.

In some aspects, the method may also include classifying the configuration information obtained from each of the one or more network services and grouping the configuration information into one or more groups based on a similarity comparison, where the one or more groups includes shared intents, functions, and applications of the configuration information within the network.

In one aspect, a network device includes one or more memories having computer-readable instructions stored therein. The network device also includes one or more processors configured to execute the computer-readable instructions to receive configuration information from one or more network services in a network, the configuration information including configuration descriptions of rules configured on respective services. The network device also includes one or more processors configured to analyze the configuration information for the one or more network services to identify the rules on the respective services that have similar intents. The network device also includes one or more processors configured to present the identified rules on the respective services that have similar intents together in a group in a user interface, receive an input to expand the group of the identified rules, where respective rules of the identified rules are presented in a normalized manner to facilitate easy comparison, in response to identifying a similar rule to the identified rules. The network device also includes one or more processors configured to present the similar rule proximate to the group of the identified rules with a suggestion to modify the similar rule to correspond to the identified rules, determine a configuration update for one of the network services on which the similar rule is configured to apply a change to the similar rule that will make the similar rule correspond to the identified rules. The network device also includes one or more processors configured to transmit the configuration updates to each of the plurality of network services in a network.

In one aspect, a non-transitory computer-readable storage medium includes computer-readable instructions, which when executed by one or more processors of a network appliance, cause the network appliance to receive configuration information from one or more network services in a network, the configuration information including configuration descriptions of rules configured on respective services, analyze the configuration information for the one or more network services to identify the rules on the respective services that have similar intents, present the identified rules on the respective services that have similar intents together in a group in a user interface, receive an input to expand the group of the identified rules, where respective rules of the identified rules are presented in a normalized manner to facilitate easy comparison, in response to identifying a similar rule to the identified rules, present the similar rule proximate to the group of the identified rules with a suggestion to modify the similar rule to correspond to the identified rules, determine a configuration update for one of the network services on which the similar rule is configured to apply a change to the similar rule that will make the similar rule correspond to the identified rules, and transmit the configuration updates to each of the plurality of network services in a network.

The following description is directed to certain implementations for the purposes of describing innovative aspects of this disclosure. However, a person having ordinary skill in the art will readily recognize that the teachings herein can be applied in a multitude of different ways. The described implementations can be implemented in any device, system or network that is capable of transmitting and receiving radio frequency (RF) signals according to one or more of the Institute of Electrical and Electronics Engineers (IEEE) 802.11 standards, the IEEE 802.15 standards, the Bluetooth® standards as defined by the Bluetooth Special Interest Group (SIG), or the Long Term Evolution (LTE), 3G, 4G or 5G (New Radio (NR)) standards promulgated by the 3rd Generation Partnership Project (3GPP), among others. The described implementations can be implemented in any device, system or network that is capable of transmitting and receiving RF signals according to one or more of the following technologies or techniques: code division multiple access (CDMA), time division multiple access (TDMA), frequency division multiple access (FDMA), orthogonal FDMA (OFDMA), single-carrier FDMA (SC-FDMA), single-user (SU) multiple-input multiple-output (MIMO) and multi-user (MU) MIMO. The described implementations also can be implemented using other wireless communication protocols or RF signals suitable for use in one or more of a wireless personal area network (WPAN), a wireless local area network (WLAN), a wireless wide area network (WWAN), or an internet of things (IOT) network.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims or can be learned by the practice of the principles set forth herein.

Managing configurations across a diverse array of network security products can be a daunting task in today's complex networking landscape. This is due to the vast array of available network security products, each with its unique configuration parameters, settings, and interfaces. The challenge becomes even more significant when dealing with a mix of devices and services from different vendors and platforms. It is crucial to ensure that rules with similar intent are configured consistently across services to reduce the risk of unintended performance issues. This consistency in configuration reduces the likelihood of inconsistently configured services causing anomalies in the broader security environment.

Misconfigurations in network systems can have serious consequences. These issues can lead to connectivity problems, security breaches, and a variety of other problems that can be difficult to identify and resolve. Misconfigurations can result in a range of consequences, from security vulnerabilities and service disruptions to compliance violations, performance issues, and higher operational costs. It is crucial to identify and address these issues quickly in order to mitigate the risks they pose to network systems.

Recognizing the severity of these challenges, it has become increasingly paramount to implement automation, standardized configuration templates, and robust network management tools to alleviate the intricacies associated with managing configurations across diverse network security products. Regular audits and security assessments are also integral to the process, enabling the early detection and rectification of misconfigurations before they lead to critical network issues or security breaches.

The present technology is built on top of an analysis of many networks' configurations to both identify common security policy configurations across different security services and to identify intents of security policies in a network and match these to security policy configurations across different security services.

Based on this analysis, the present technology can provide a zero-day configuration interface and service that can request information about intents and can configure security policies across different security services.

Also, based on this analysis, the present technology can conduct an analysis of an enterprise's existing configurations across multiple security services to identify the intent of the existing configurations and suggest changes to improve the configurations to better deliver on the identified intent. This approach offers significant advantages, simplifying the way customers perceive and manage their policies while effectively reducing the occurrence of misconfigurations. Misconfigurations typically arise when a policy designed for a specific intent exists in one service but lacks alignment with another, resulting in inconsistencies that disrupt the expected outcomes for clients.

Additionally, the innovation introduces the capability to provide recommendations aimed at harmonizing policies and pinpointing the specific locations where these underlying policies are configured. Furthermore, it offers the option to remove policies or configurations that do not contribute value to the overall security posture. In a progressive dimension, this entire process can be augmented with artificial intelligence (AI) technologies, harnessing the power of AI to enhance the efficiency and effectiveness of configuration analysis and policy management procedures.

In an example, a network system, which leverages machine learning techniques to analyze and streamline the configurations of various network devices and appliances within the system, can identify correlations or patterns among a multitude of rules or configurations, ultimately seeking out similarities that exist across the spectrum of configurations. By examining configurations comprehensively, the system can autonomously discern commonalities, whether in terms of security policies, routing protocols, or access control rules. It accomplishes this by comparing and contrasting configurations, identifying recurring patterns, and establishing links between related settings amongst the network devices.

Once these correlations are established, the system can organize and display the configurations based on their inherent similarities, efficiently creating a comprehensive configuration landscape that facilitates the discovery of optimal configuration settings and potential optimizations of these settings when applying them to network devices within the network environment. By recognizing the impact of network devices in the network environment through the finding of these correlations, potential security vulnerabilities can be identified, rule set groups can be optimized to ensure minimal misconfigurations of network devices that can impact other network devices within the network and promote a standardized approach to configuration management. This approach, coupled with machine learning algorithms, enables proactive management, efficient troubleshooting, and the swift implementation of changes across the network.

FIG. 1 illustrates a network system diagram in accordance with some embodiments of the present technology. In the realm of network management, a network controller 106 can orchestrate efficient and secure network configurations between an administrator device 102 and a plurality of network devices 104. The controller 106 can receive a plurality of requests from the administrator device 102, initiating the generation of a network configuration policy suitable for the network device 104 to serve the client device within the network. The interaction between the network device 104 and the controller ensures that the network configuration policy is consistent with real-time insights, ensuring that network policies are not just randomly generated but are tailored based on the most recent and relevant configurations employed within the network being served.

The network controller 106 adeptly processes requests to configure one or more network services, which may encompass desired configurations and network settings related to diverse network services 108, 110, 112, 114, and their associated network devices 104. In this process, the network controller analyzes each element of the request. It systematically identifies network settings and configurations within the request, discerning compatibility among them.

This analysis involves the network controller 106 determining correlations between the received network settings and configurations. It assesses their interplay and synergy, ensuring that the amalgamation of configurations aligns cohesively to achieve optimal functionality across various network devices 104 serving and securing the network. The controller's approach seeks to eliminate conflicts and redundancies, paving the way for a harmonized and efficient network configuration policy.

Furthermore, the network controller 106 applies its intelligence to ascertain the applicability of these processed settings and configurations to various network services, such as the gateway 108, DNS 110, Data Loss Prevention (DLP) 112, and firewall 114. By discerning the specific requirements of each network service, the controller tailors the configurations to ensure seamless integration and performance. This analysis performed by the network controller 106 ensures that the custom network configuration policy generated enhances the efficacy of each network device serving and safeguarding the network.

FIG. 2A-FIG. 2K illustrates an example interface 200 for generating network configuration policies in accordance with some embodiments of the present technology. The interface can guide an administrator in the creation of zero-day (an unconfigured state) network security policies across several security services. The interface aims to simplify the process of creating network configuration policies for administrators by providing a set of questions related to an enterprise's specific network setup. The interface can utilize advanced algorithms and machine learning techniques to suggest network configurations that are tailored to the various requirements of each portion of the network system based on one or more selections by the administrator. Accordingly, the administrator can select from a variety of policy options generated by the platform, ensuring that the network devices are set up in an efficient and effective manner. Additionally, the platform repeatedly updates its algorithms based on real-time data and feedback from administrators, ensuring that it consistently provides the latest and most relevant policy options for an ever-evolving network environment. Thus, network administrators can leverage the platform to manage enterprise network systems confidently and effectively without spending extensive time and resources on manual configuration processes.

Figure 2A:
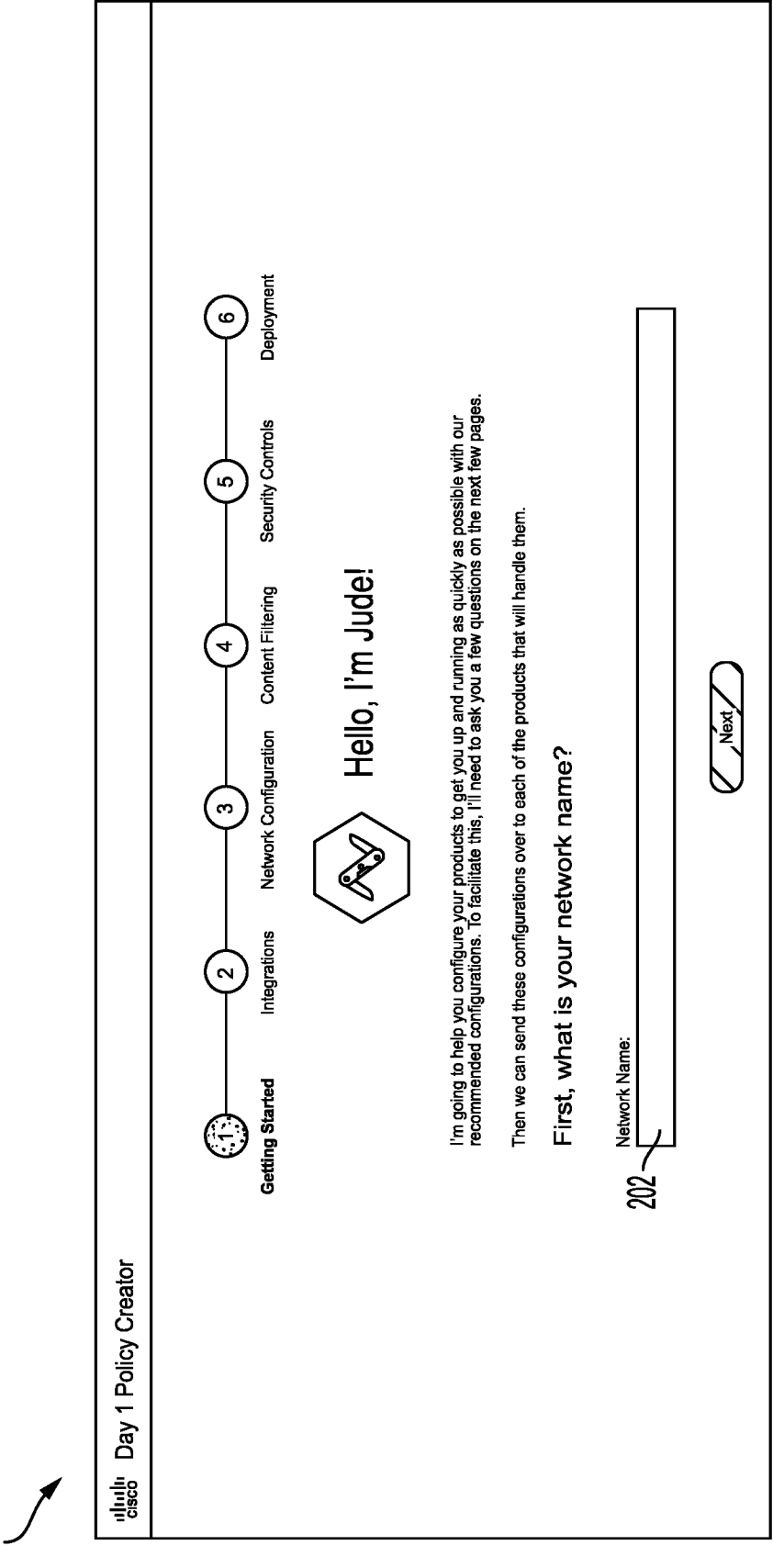
FIG. 2A illustrates an example platform for generating network configuration policies in accordance with some embodiments of the present technology.

In FIG. 2A of the depicted interface 200, the initial step involves a user-friendly interface that prompts administrators to provide essential information about the network slated for configuration. The interface 200, as shown in FIG. 2A can initiate a first request 202 by requesting the administrator to input a distinct and identifiable network name associated with the targeted network. The identification of the network name serves as a fundamental identifier, allowing the platform to differentiate and categorize multiple networks within a larger network. This ensures precision in generating configurations tailored to the network's specific characteristics and requirements. Additionally, the inputted network received via the first request 202 lays the groundwork for establishing a centralized and organized approach to network management. By associating configurations with the received network name, the interface 200 can easily track, manage, and update settings for different networks, fostering a streamlined and efficient administrative process.

Figure 2B:
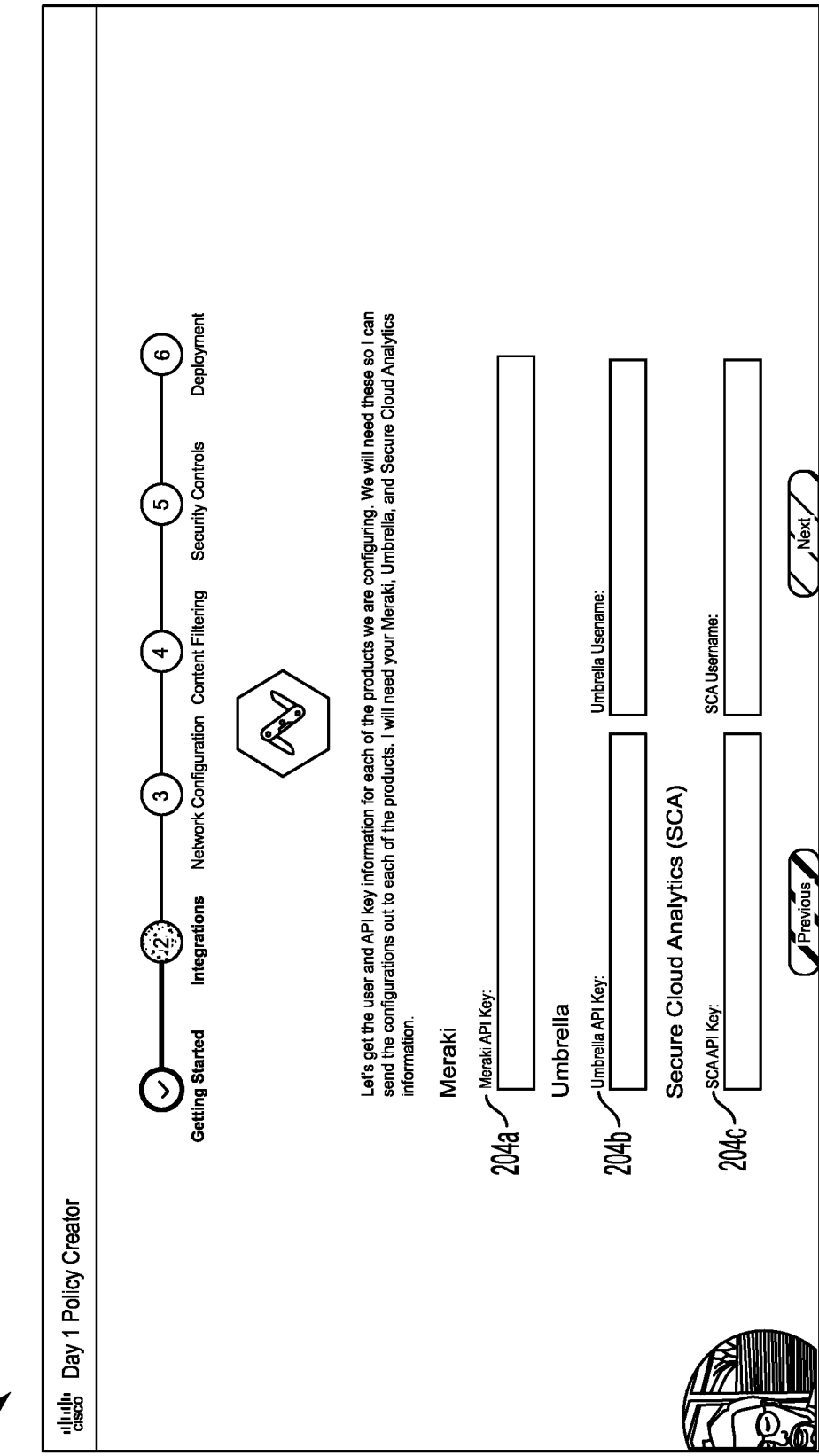
FIG. 2B illustrates a first continuation of the example platform for generating network configuration policies in accordance with some embodiments of the present technology.

In FIG. 2B, the interface 200 can further initiate a second request that requests a plurality of additional information 204a, 204b, 204c, which requests API key information for each product network configuration policies will be generated. By soliciting API key information through these additional requests, the platform ensures seamless integration and interaction with the Application Programming Interfaces (APIs) of the targeted products. The API key, acting as an authentication credential, establishes a secure and authorized channel between the platform and the products, facilitating the configuration process.

The request for API key information is integral to the adaptability of the interface 200. Different products may have distinct API structures and authentication mechanisms, and by seeking this key information, the platform acknowledges and accommodates this diversity. This dynamic approach allows the interface 200 to configure a myriad of products, each with its unique set of network configuration policies. Accordingly, the collected API key information acts as a digital handshake, enabling the platform to communicate effectively with the designated products, retrieve relevant data, and implement tailored configurations seamlessly.

While FIG. 2A-FIG. 2B illustrates the specific Cisco Technologies security services Meraki, Umbrella and Secure Cloud Analytics, the present technology is not limited to three security services, or even Cisco services. The depicted services are merely by way of example and any security services from any provider can be listed. The key aspect is to identify the API keys needed to interact with the security services of the network.

Figure 2C:
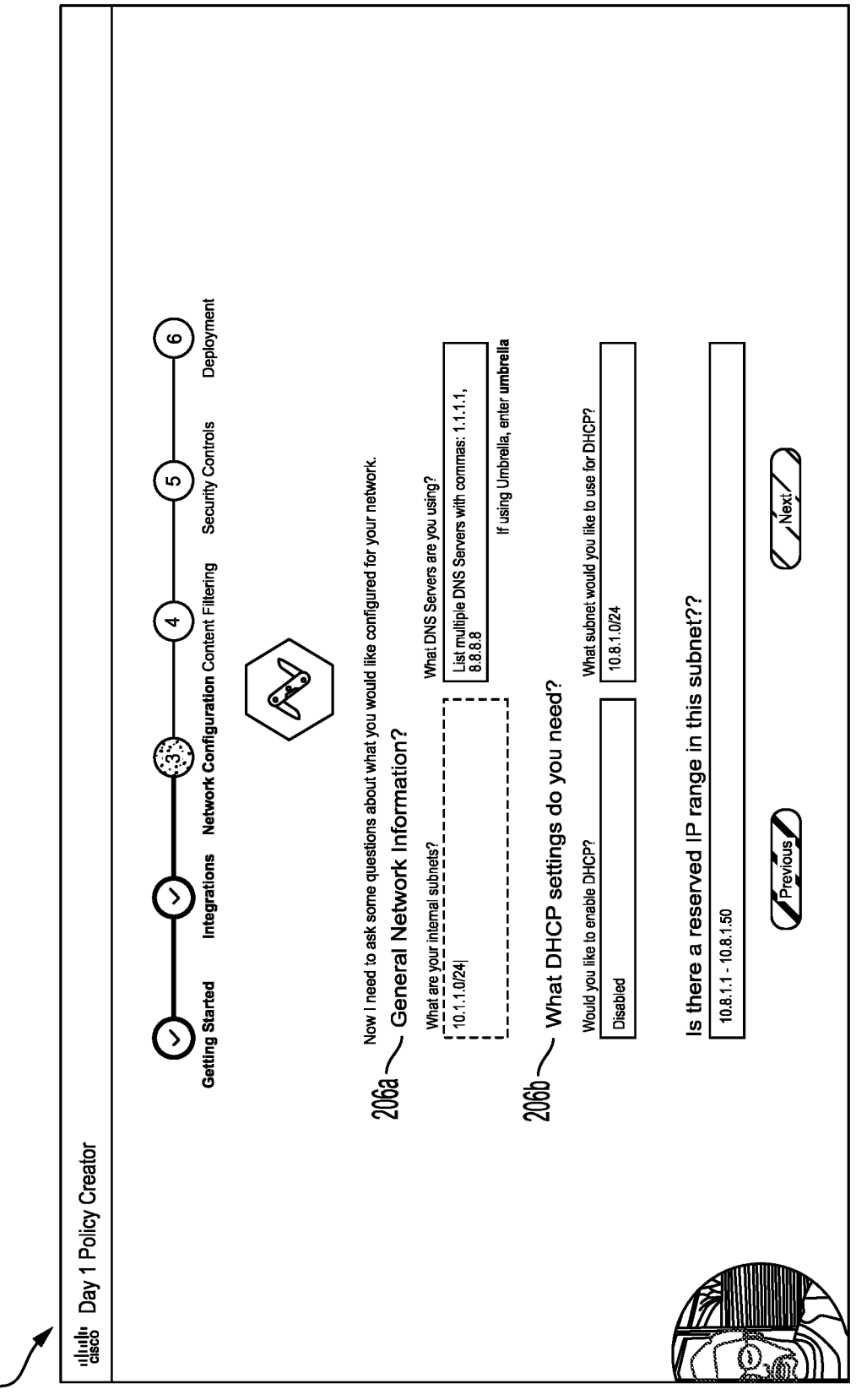
FIG. 2C illustrates a second continuation of the example platform for generating network configuration policies in accordance with some embodiments of the present technology.

In FIG. 2C of the depicted interface 200, the third request gathers information about the general network information 206a and Dynamic Host Configuration Protocol (DHCP) settings 206b related to the network.

The general network information 206a request serves as a collector for fundamental details related to the network. Administrators are prompted to provide inputs pertaining to the internal subnets of the network and the Domain Name System (DNS) servers in use in the network. Inputs related to internal subnets allow the platform to understand the segmentation of the network, facilitating the creation of targeted and effective policies for each subnet. Additionally, gathering information about DNS servers ensures that the platform can incorporate DNS-related configurations seamlessly into the generated policies The second input, focusing on the DHCP settings 206b delves into the specifics of how the Dynamic Host Configuration Protocol should be configured within the network.

Administrators are prompted to provide inputs regarding whether DHCP should be enabled or disabled, the type of subnet intended for DHCP use, and a reserved IP range within that subnet applicable to the network products. This DHCP settings 206b allow for automating the assignment of IP addresses within the network. By understanding whether DHCP is enabled or disabled and the specific subnet and reserved IP range configurations, the platform ensures that network devices receive accurate and consistent IP addresses, streamlining network management and enhancing overall operational efficiency.

Figure 2D:
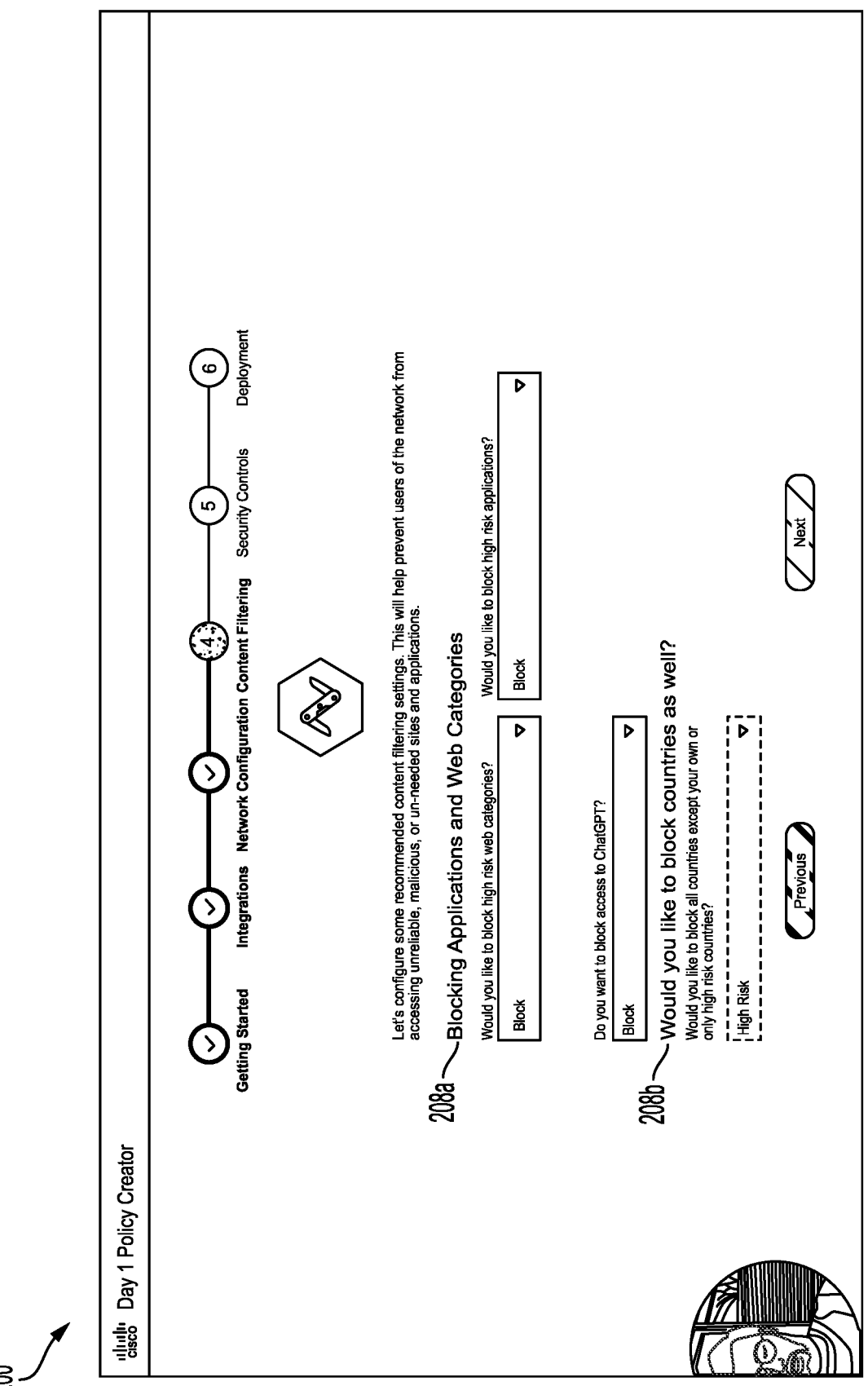
FIG. 2D illustrates a third continuation of the example platform for generating network configuration policies in accordance with some embodiments of the present technology.

In FIG. 2D of the depicted interface 200, the fourth request collects information related to content filtering intents for the network. This particular request is geared towards enhancing network security and ensuring a controlled online environment for users. The primary objective of this request is to empower administrators with the tools necessary to prevent users on the network from accessing unreliable, malicious, or unnecessary websites and applications.

The fourth request encompasses two distinct components. First, the fourth request includes receiving a request for settings related to blocking applications and web categories 208a, where the administrators are prompted to input preferences regarding whether the network configuration policy should block high-risk categories or applications. This granularity of control ensures administrators can tailor content filtering to specific security needs. Additionally, administrators can specify settings related to the accessibility of certain applications, such as ChatGPT, providing flexibility based on the network's requirements and security considerations. The second component includes settings related to countries to block 208b where administrators input preferences for blocking access to content from specific countries. This feature enhances the platform's capability to enforce regional restrictions within the network, contributing to a more secure and controlled online environment. Using the example of countries to block 208b, the administrator can articulate an intent of how permissive of a policy the administrator wishes to create. By selecting 'High Risk,' the administrator is signaling an intent to have a generally permissive policy that only blocks traffic from countries known to be associated with intellectual property theft and malicious behavior (e.g., countries such as Russia, China, North Korea, etc.). The present technology can generate policies for each of these countries automatically.

In order to block high-risk categories of Internet traffic and applications, there are several security policies that can be configured. These can include setting up firewall rules to block incoming and outgoing traffic associated with high-risk categories of internet traffic and applications. This can be done by analyzing IP addresses, ports, protocols, or domain names associated with these categories. This can also include implementing content filtering to block access to websites or specific categories of websites known to pose security risks. This can be achieved by using web filtering solutions that categorize websites based on their content or reputation. This can also include policies for Intrusion Detection and Prevention Systems (IDPS) to detect and prevent attacks targeting high-risk applications or traffic. These systems can monitor network traffic for known attack signatures or anomalies and take appropriate actions to defend against them. This can also include maintaining a centralized list of trusted and untrusted applications within your network. The present technology can configure all of these policies and more from the articulation of intent provided in interface 200.

Figure 2E:
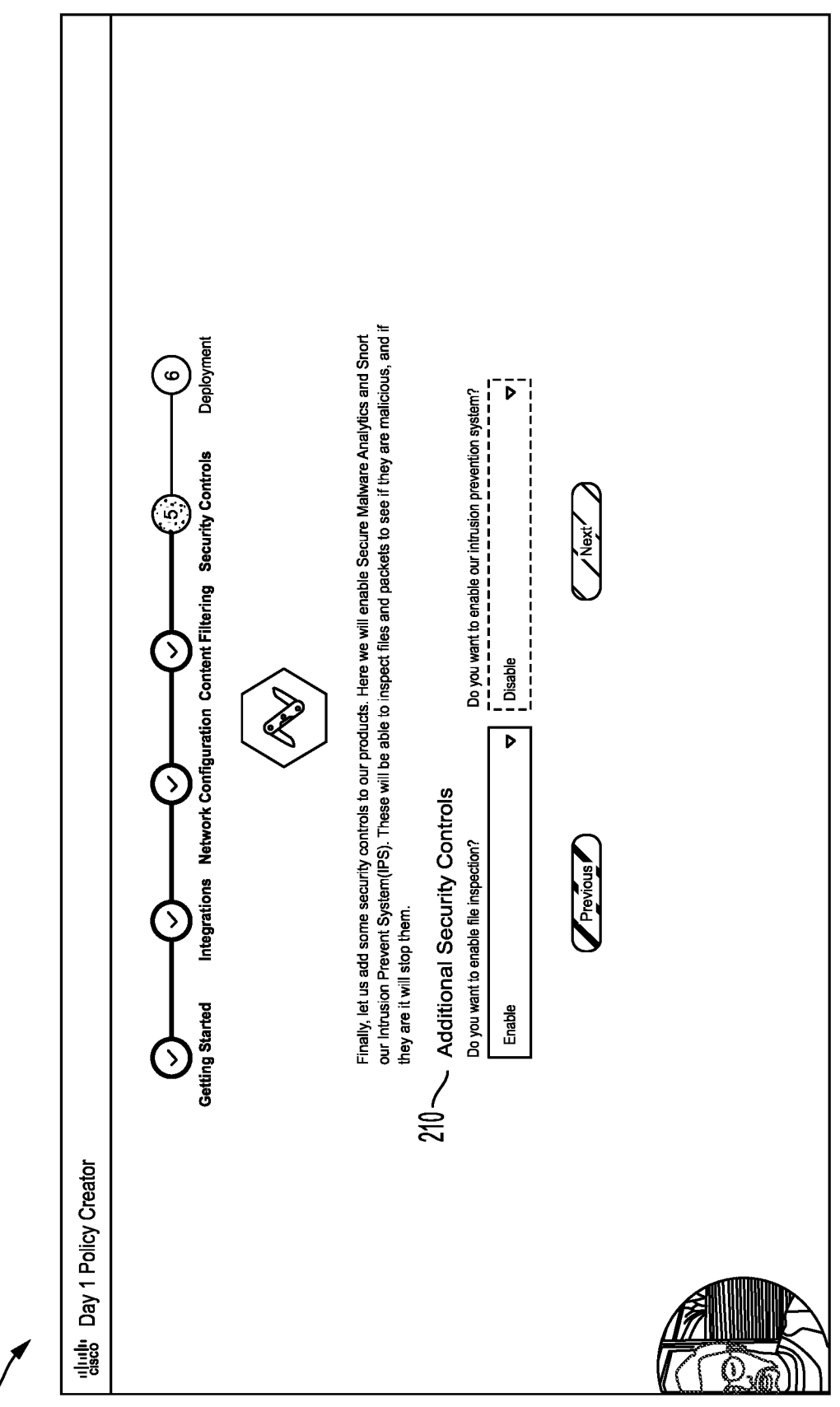
FIG. 2E illustrates a fourth continuation of the example platform for generating network configuration policies in accordance with some embodiments of the present technology.

In FIG. 2E of the depicted interface 200, the fifth request collects information related to additional security controls 210. The additional security controls 210 can specify product specific security controls that enable secure malware analytics and intrusion prevention systems, to assist with inspecting files and Data packets to identify if they are malicious to the network.

The focal point of this fifth request is the specification of product-specific security controls, geared explicitly towards enabling secure malware analytics and intrusion prevention systems. These controls play a crucial role in scrutinizing files and Data packets traversing the network, thereby identifying, and preventing malicious entities from compromising the network's integrity.

In particular, the additional security controls 210 incorporates a first input that facilitates the specification of whether file inspection will be enabled to scrutinize incoming data within the network. This feature ensures a proactive approach to identifying and mitigating potential threats by inspecting files for malicious content, fortifying the network's defenses against evolving cyber threats.

Furthermore, the additional security controls 210 introduces a second input, allowing administrators to indicate whether the intrusion prevention system is to be enabled. This level of control empowers administrators to proactively guard against intrusion attempts, adding an additional layer of security to the network infrastructure.

Like the example of blocking high-risk categories of Internet traffic and applications, there are several security policies that can be configured based on the indication of intent provided in FIG. 2E.

Figure 2F:
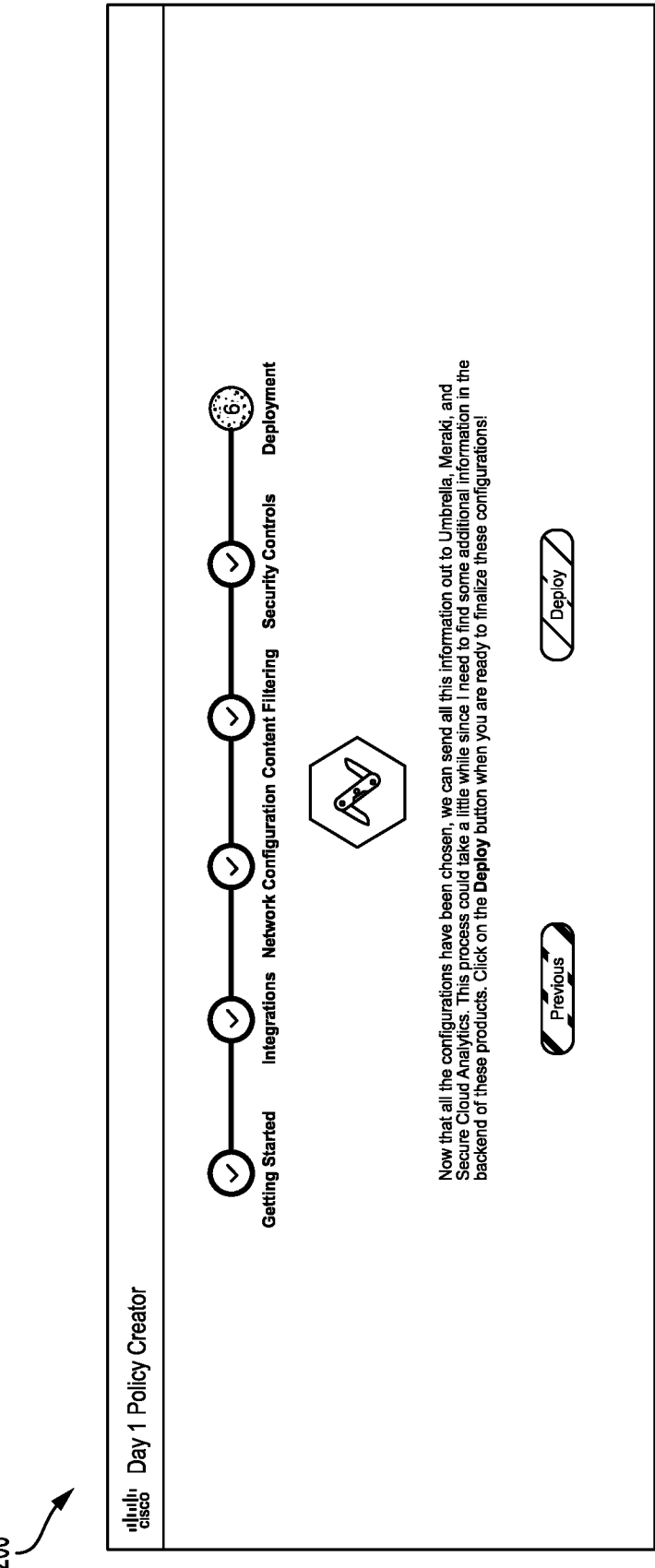
FIG. 2F illustrates a fifth continuation of the example platform for generating network configuration policies in accordance with some embodiments of the present technology.

In FIG. 2F of the depicted interface 200, the administrator can be prompted to deploy the network configurations input in FIG. 2A-FIG. 2D to each of the products specified in FIG. 2A and the second request 204a, 204b, 204c.

Figure 2G:
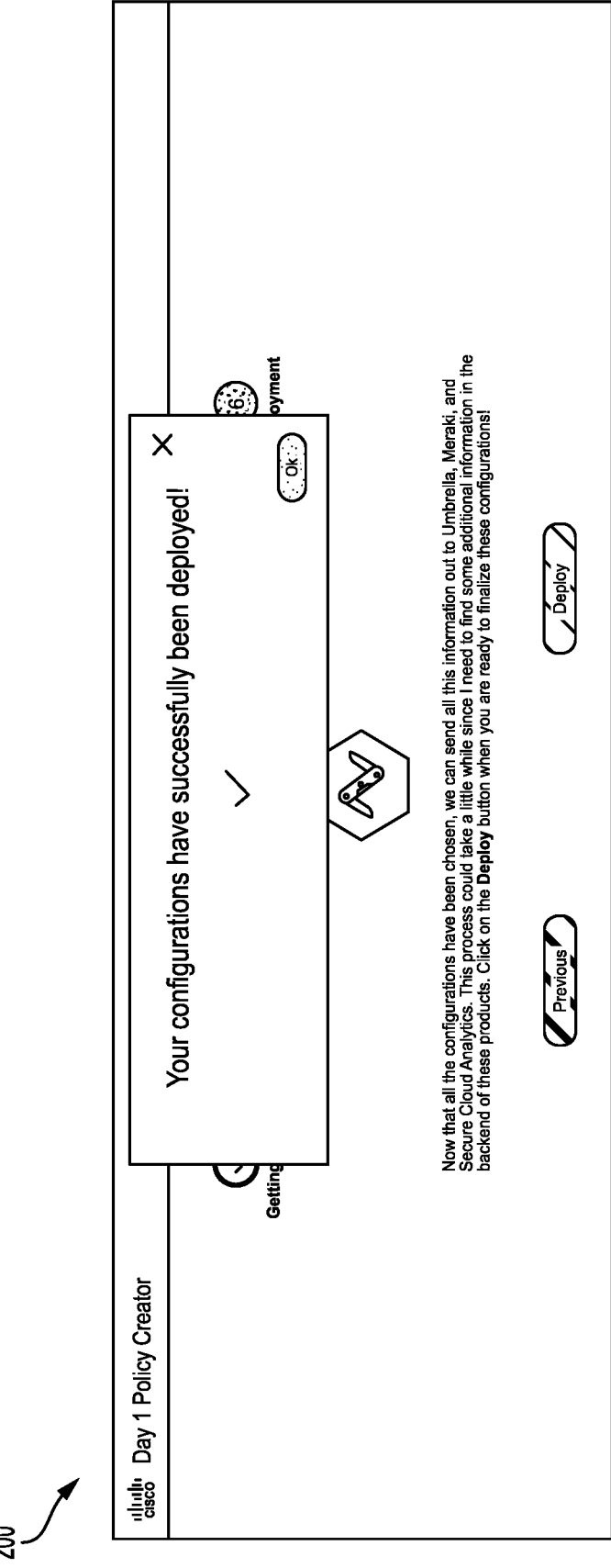
FIG. 2G illustrates a sixth continuation of the example platform for generating network configuration policies in accordance with some embodiments of the present technology.

In FIG. 2G of the depicted interface 200, the administrator can be notified that the deployment of the network configurations in the FIG. 2E was successfully deployed.

Figure 2H:
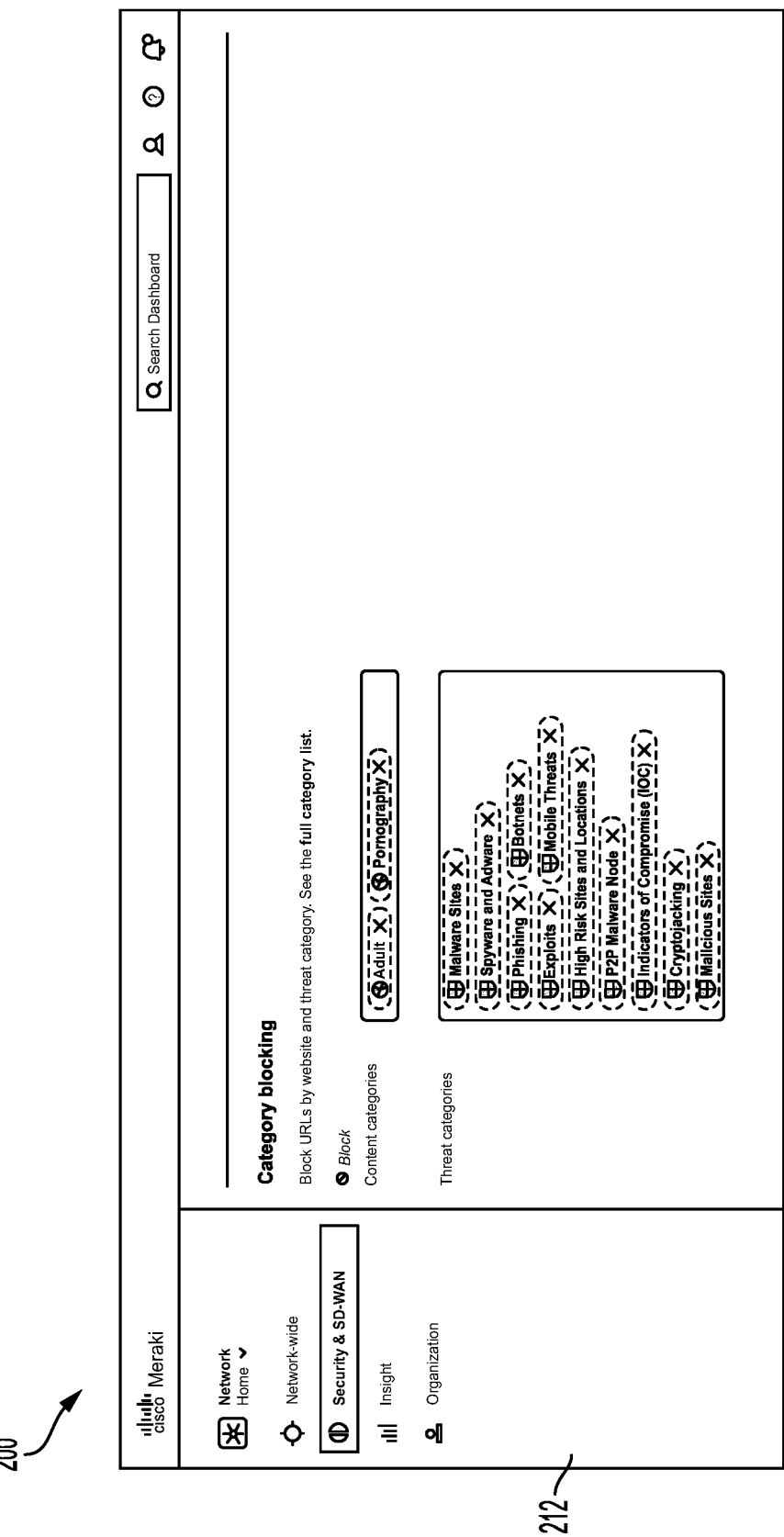
FIG. 2H illustrates a seventh continuation of the example platform for generating network configuration policies in accordance with some embodiments of the present technology.
Figure 2H:
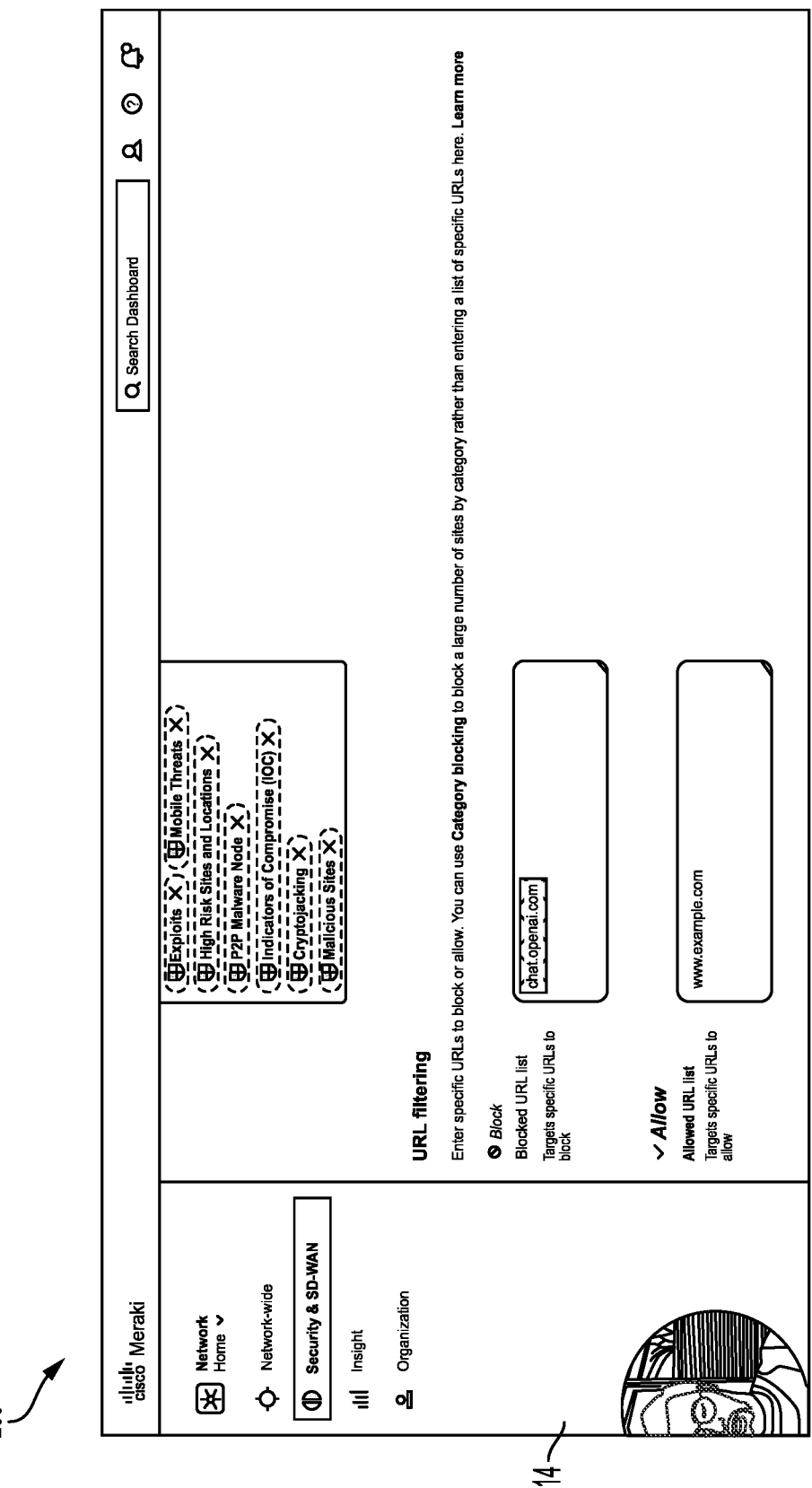

FIG. 2H shows that upon completion of the deployment of the network configurations, interface 200 can generate for the plurality of security products, network configuration policies related to the category blocking as shown in the first depiction 212. Category blocking can include the full list of blocked URLs by the website and threat category, as well as content categories that are also intended to be blocked. Threat categories can also be specified to ensure that certain threat types are also prevented from affecting the network. In the second depiction 214, network configuration policy settings related to URL filtering can be specified. Specific URLs can be entered, or automatically specified that are associated with the content categories and the threat categories specified in the first depiction 212. All of these individual configurations are generated based on the declared intent of the administrator in the preceding figures.

Upon the successful deployment of network configurations, interface 200 exhibits its capability by generating comprehensive network configuration policies tailored for the plurality of security products, exemplified in the first depiction 212. Notably, these policies encompass category-blocking features, presenting a detailed roster of blocked URLs categorized by both website and threat type. Additionally, content categories slated for restriction are included in the network configuration policy, fortifying network security and control. Administrators can further specify threat categories, ensuring a targeted prevention approach against distinct threat types that might jeopardize the network's integrity.

In the second depiction 214, the interface 200 extends its functionality by incorporating network configuration policy settings designed explicitly for URL filtering. This feature allows administrators to define the URLs to be blocked precisely, either by manual entry or through automatic specification based on the content and threat categories outlined in the first depiction 212. All of these individual configurations are generated based on the declared intent of the administrator in the preceding figures.

Figure 2I:
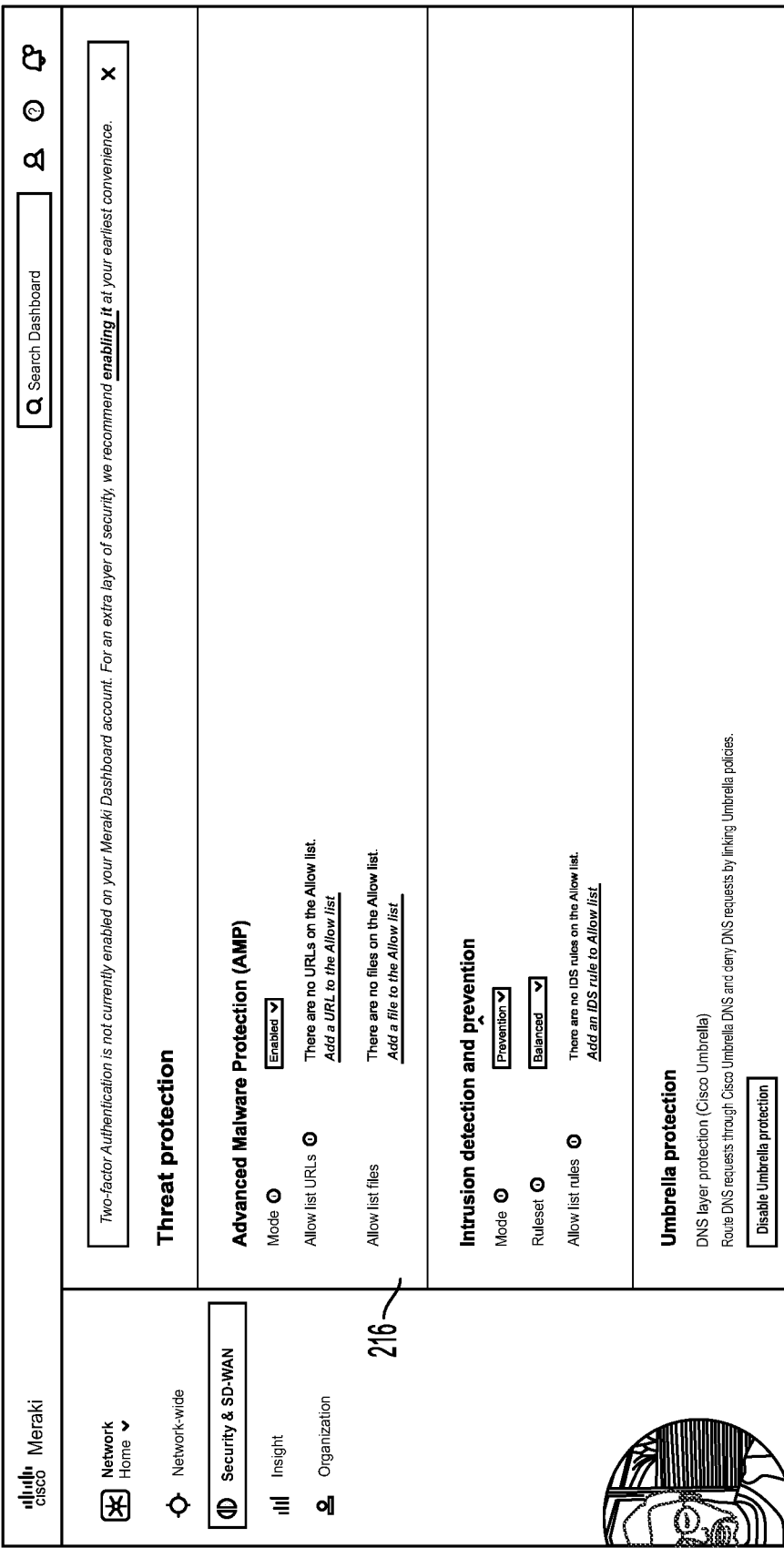
FIG. 2I illustrates an eighth continuation of the example platform for generating network configuration policies in accordance with some embodiments of the present technology.

In FIG. 2I, the network configuration policy can further specify specific threat protection configurations 216. These configurations encompass crucial elements vital for a resilient security stance, including Advanced Malware Protection (AMP) settings, intrusion detection and prevention settings, and umbrella protections. The AMP settings, a cornerstone of this configuration, offer administrators the ability to specify the enablement mode and curate an allowed list of URLs and files. The AMP settings provide a vigilant defense against sophisticated malware threats, allowing the network to possess customized protection based on the network's unique requirements.

Furthermore, the intrusion detection and prevention settings provide administrators with granular control over the prevention mode, ruleset application, and an allowed list of rules. This level of specificity empowers the network to proactively thwart potential intrusion attempts, reinforcing the network's integrity through strategic configuration.

The umbrella protection specifications in FIG. 2I accentuates and emphasizes DNS layer protections. This additional layer of defense fortifies the network against threats at the DNS level, contributing to a robust shield against various forms of malicious activities.

All of these individual configurations are generated based on the declared intent of the administrator in the preceding figures.

Figure 2J:
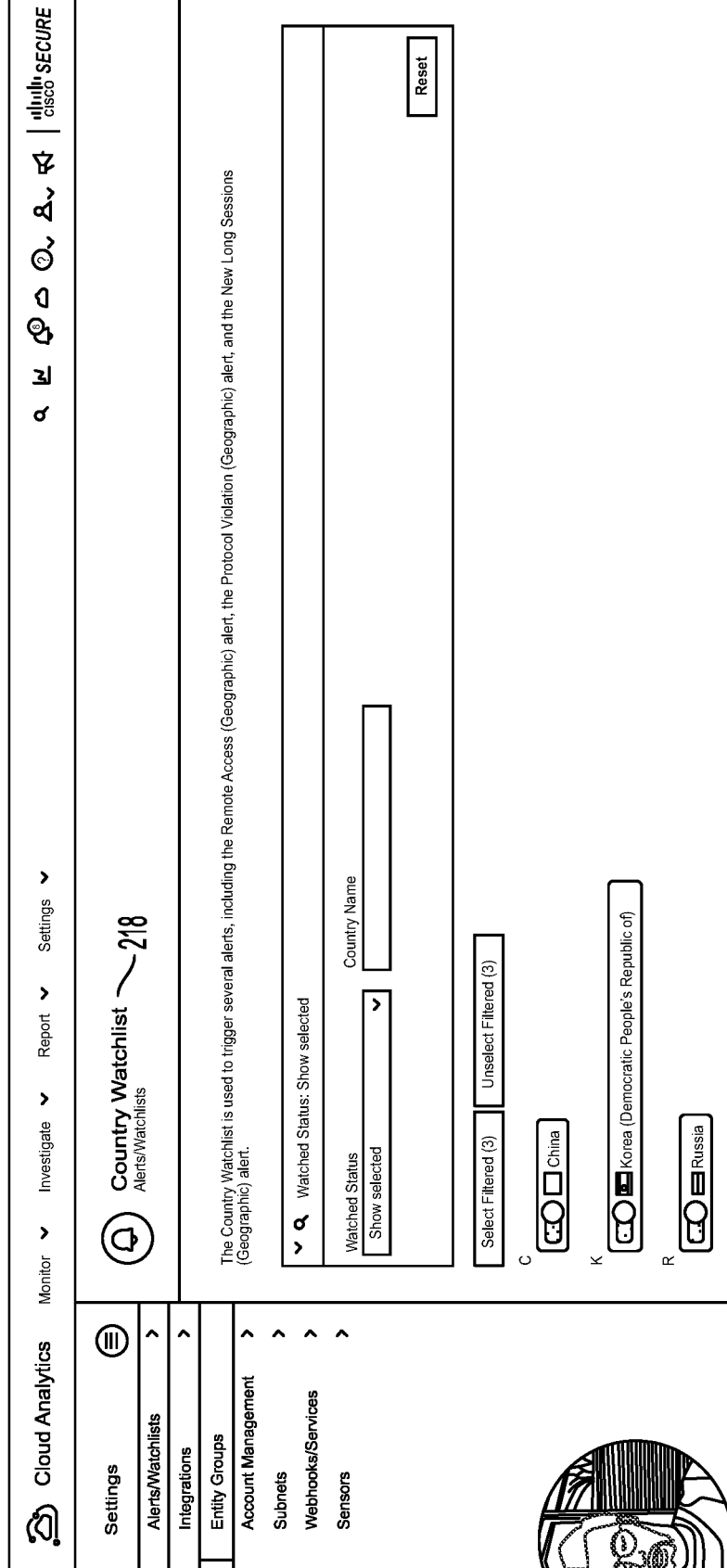
FIG. 2J illustrates a ninth continuation of the example platform for generating network configuration policies in accordance with some embodiments of the present technology.

In FIG. 2J, the network configuration policy can further specify a country watchlist 218.

The country watchlist 218 features triggering alerts related to remote access, protocol violations, and new long sessions based on geographic location. Network administrators can wield manual assertive control over the country watchlist 218, with options to manually toggle the inclusion of specific countries. Thus, this dynamic functionality empowers network administrators to tailor their network security strategies based on geopolitical considerations, ensuring an assertive response to potential threats originating from specific regions. All of these individual configurations are generated based on the declared intent of the administrator in the preceding figures.

Figure 2K:
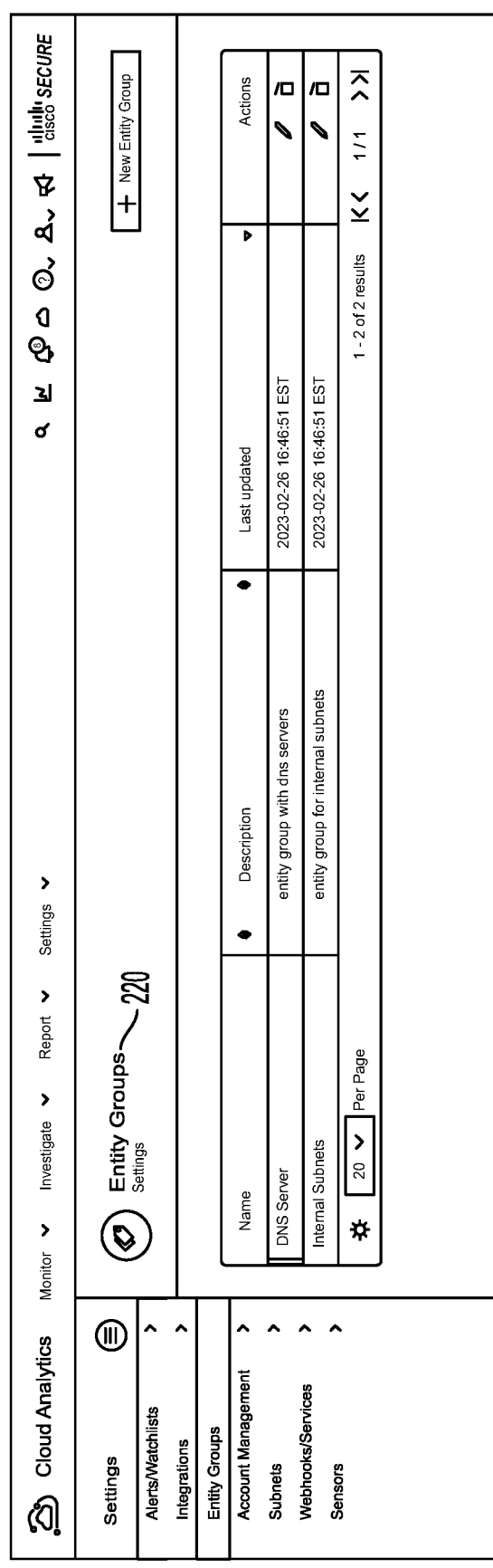
FIG. 2K illustrates a tenth continuation of the example platform for generating network configuration policies in accordance with some embodiments of the present technology.

In FIG. 2K, the network configuration policy can further specify a plurality of entity group settings 220.

The entity group settings 220 can specify multiple entity groups, each defining network settings such as DNS servers and internal subnets that share similar configurations. This organizational granularity enhances network efficiency and management by grouping entities with common configurations, facilitating streamlined administration and targeted policy application. All of these individual configurations are generated based on the declared intent of the administrator in the preceding figures.

Figure 3A:
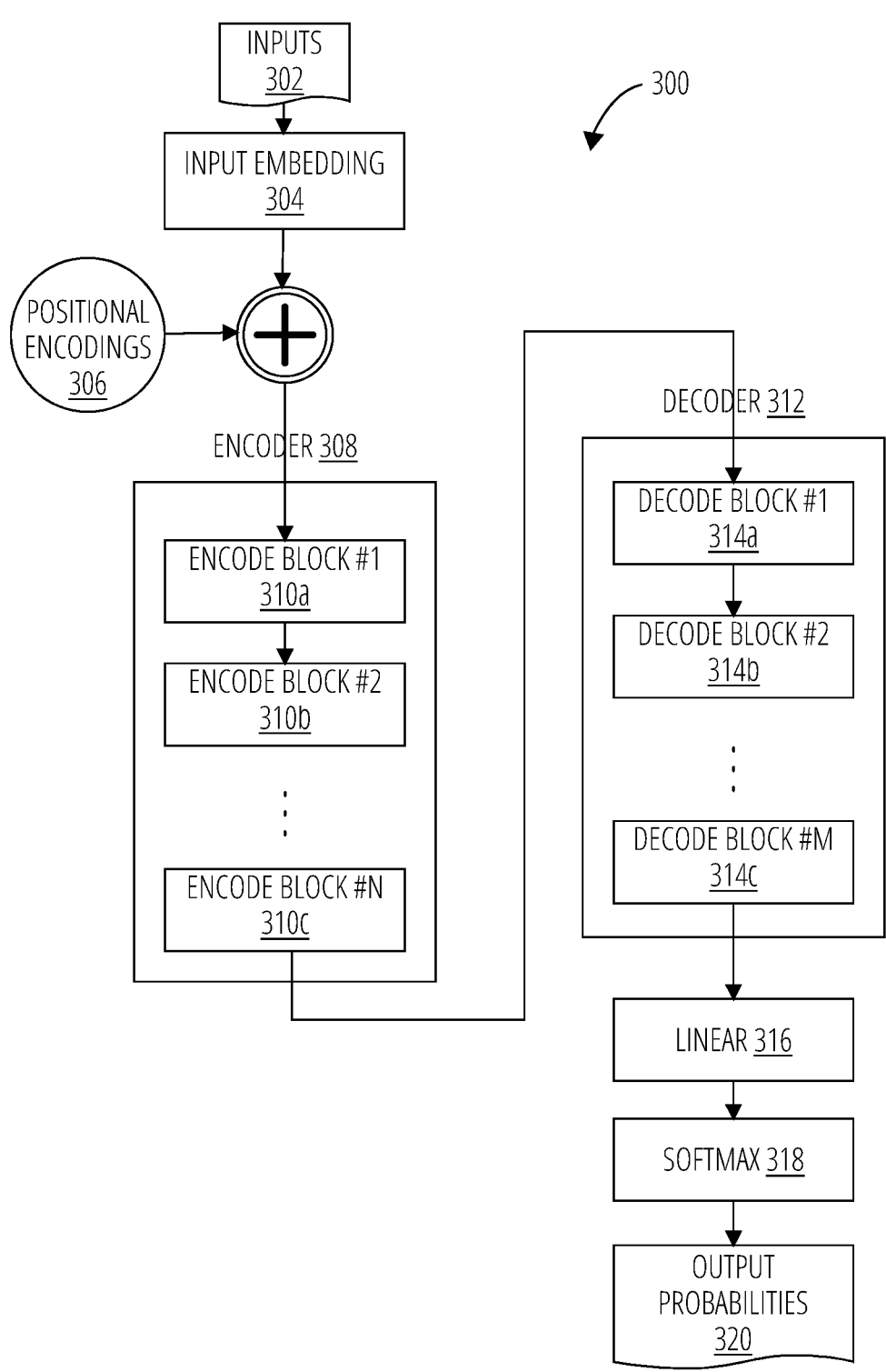
FIG. 3A illustrates a block diagram for an example of a transformer neural network architecture in accordance with some embodiments of the present technology.

FIG. 3A illustrates a block diagram for an example of a transformer neural network architecture, in accordance with certain embodiments. According to certain non-limiting examples, the transformer architecture 300 is illustrated in FIG. 3A through FIG. 3C as including inputs 302, an input embedding block 304, positional encodings 306, an encoder 308 (e.g., encode blocks 310a, 310b, and 310c), a decoder 312 (e.g., decode blocks 314a, 314b, and decode block 314c), a linear block 316, a softmax block 318, and output probabilities 320.

The input embedding block 304 is used to provide representations for words. For example, embedding can be used in text analysis. According to certain non-limiting examples, the representation is a real-valued vector that encodes the meaning of the word in such a way that words that are closer in the vector space are expected to be similar in meaning. Word embeddings can be obtained using language modeling and feature learning techniques, where words or phrases from the vocabulary are mapped to vectors of real numbers. According to certain non-limiting examples, the input embedding block 304 can be learned embeddings to convert the input tokens and output tokens to vectors of dimension that have the same dimension as the positional encodings, for example.

The positional encodings 306 provide information about the relative or absolute position of the tokens in the sequence. According to certain non-limiting examples, the positional encodings 306 can be provided by adding positional encodings to the input embeddings at the inputs to the encoder 308 and decoder 312. The positional encodings have the same dimension as the embeddings, thereby enabling a summing of the embeddings with the positional encodings. There are several ways to realize the positional encodings, including learned and fixed. For example, sine and cosine functions having different frequencies can be used. That is, each dimension of the positional encoding corresponds to a sinusoid. Other techniques of conveying positional information can also be used, as would be understood by a person of ordinary skill in the art. For example, learned positional embeddings can instead be used to obtain similar results. An advantage of using sinusoidal positional encodings rather than learned positional encodings is that doing so allows the model to extrapolate to sequence lengths longer than the ones encountered during training.

Figure 3B:
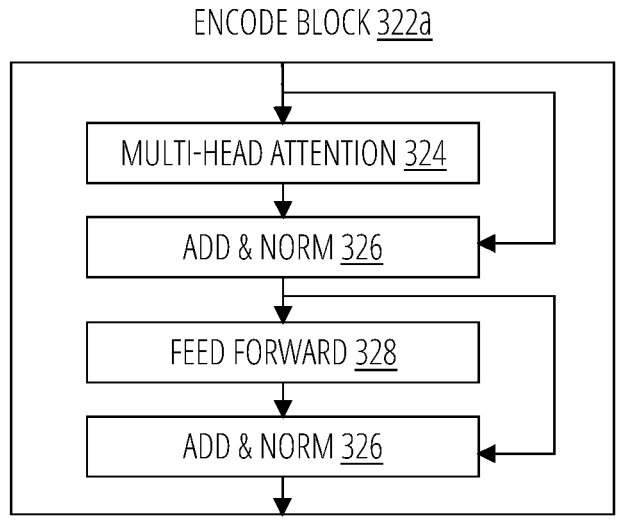
FIG. 3B illustrates a block diagram for an example of an encoder of the transformer neural network architecture in accordance with some embodiments of the present technology.
Figure 3C:
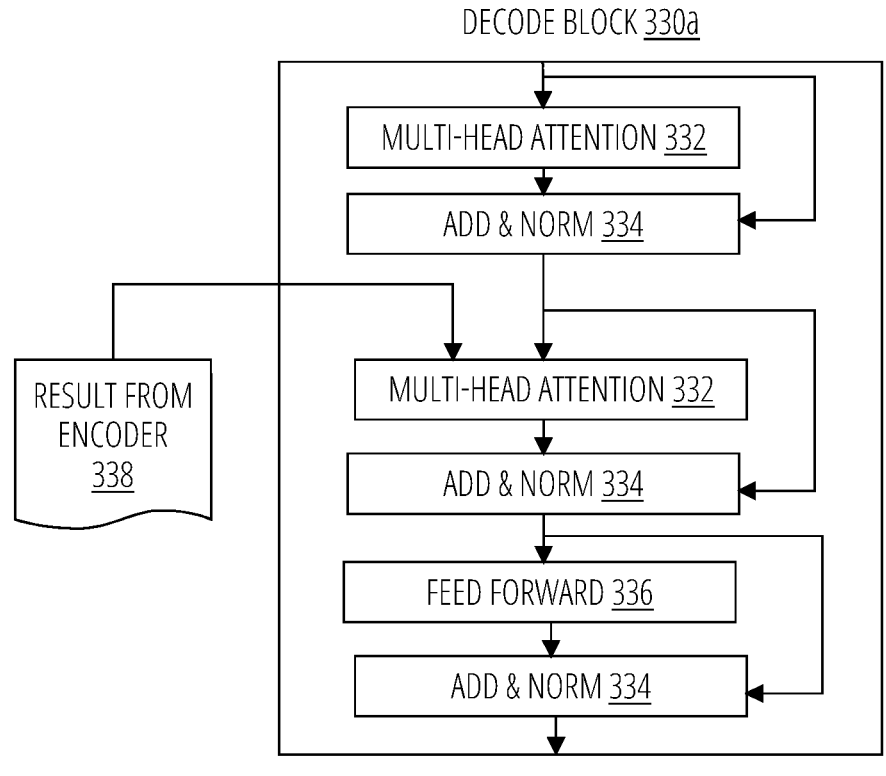
FIG. 3C illustrates a block diagram for an example of a decoder of the transformer neural network architecture in accordance with some embodiments of the present technology.

FIG. 3B illustrates a block diagram for an example of an encoder of the transformer neural network architecture, in accordance with certain embodiments.

The encoder 308 uses stacked self-attention and pointwise, fully connected layers. The encoder 308 can be a stack of N identical layers (e.g., N=6), and each layer is an encode block 410, as illustrated by encode block 310a shown in FIG. 3B. Each encode block 410 has two sub-layers: (i) a first sub-layer has a multi-head attention block 324 and (ii) a second sub-layer has a feed forward block 328, which can be a position-wise fully connected feed-forward network. The feed forward block 328 can use a rectified linear unit (ReLU).

The encoder 308 uses a residual connection around each of the two sub-layers, followed by an add & norm block 326, which performs normalization (e.g., the output of each sub-layer is LayerNorm(x+Sublayer(x)), i.e., the product of a layer normalization "LayerNorm" time the sum of the input "x" and output "Sublayer(x)" pf the sublayer LayerNorm(x+Sublayer(x)), where Sublayer(x) is the function implemented by the sub-layer). To facilitate these residual connections, all sub-layers in the model, as well as the embedding layers, produce output data having a same dimension.

FIG. 3C illustrates a block diagram for an example of a decoder of the transformer neural network architecture, in accordance with certain embodiments.

Similar to the encoder 308, the decoder 312 uses stacked self-attention and pointwise, fully connected layers. The decoder 312 can also be a stack of M identical layers (e.g., M=6), and each layer is a decode block 414, as illustrated by decode block 314*a* shown in FIG. 3C. In addition to the two sub-layers (i.e., the sublayer with the multi-head attention encode block 322*a* and the sub-layer with the feed-forward block 326) found in the encode block 310*a*, the decode block 314*a* can include a third sub-layer, which performs multi-head attention over the output of the encoder stack. Similar to the encoder 308, the decoder 312 uses residual connections around each of the sub-layers, followed by layer normalization. Additionally, the sub-layer with the multi-head attention block 324 can be modified in the decoder stack to prevent positions from attending to subsequent positions. This masking, combined with fact that the output embeddings are offset by one position, ensures that the predictions for position i can depend only on the known output data at positions less than i.

The linear block 316 can be a learned linear transformation. For example, when the transformer architecture 300 is being used to translate from a first language into a second language, the linear block 316 projects the output from the last decode block 314*c* into word scores for the second language (e.g., a score value for each unique word in the target vocabulary) at each position in the sentence. For instance, if the output sentence has seven words and the provided vocabulary for the second language has 10,000 unique words, then 10,000 score values are generated for each of those seven words. The score values indicate the likelihood of occurrence for each word in the vocabulary in that position of the sentence.

The softmax block 318 then turns the scores from the linear block 316 into output probabilities 320 (which add up to 1.0). In each position, the index provides for the word with the highest probability, and then map that index to the corresponding word in the vocabulary. Those words then form the output sequence of the transformer architecture 300. The softmax operation is applied to the output from the linear block 316 to convert the raw numbers into the output probabilities 320 (e.g., token probabilities), which are used in the process of generating the summary based on the prompt generator, generating the policy.

Figure 4A:
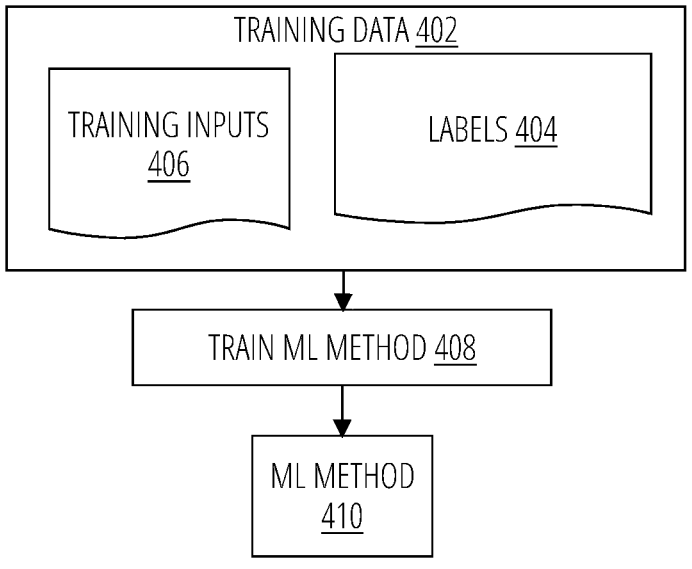
FIG. 4A illustrates a flow diagram for an example of a method of training a neural network in accordance with some embodiments of the present technology.

FIG. 4A illustrates an example of training an ML method 410 in accordance with certain embodiments. In step 408, training data 402, which includes the labels 404 and the training inputs 406) is applied to train the ML method 410. For example, the ML method 410 can be an artificial neural network (ANN) that is trained via supervised learning using a backpropagation technique to train the weighting parameters between nodes within respective layers of the ANN. In supervised learning, the training data 402 is applied as an input to the ML method 410, and an error/loss function is generated by comparing the output from the ML method 410 with the labels 404. The coefficients of the ML method 410 are iteratively updated to reduce an error/loss function. The value of the error/loss function decreases as outputs from the ML method 410 increasingly approximate the labels 404. In other words, ANN infers the mapping implied by the training data, and the error/loss function produces an error value related to the mismatch between the labels 404 and the outputs from the ML method 410 that are produced as a result of applying the training inputs 406 to the ML method 410.

For example, in certain implementations, the cost function can use the mean-squared error to minimize the average squared error. In the case of a multilayer perceptrons (MLP) neural network, the backpropagation algorithm can be used for training the network by minimizing the mean-squared-error-based cost function using a gradient descent method.

Training a neural network model essentially means selecting one model from the set of allowed models (or, in a Bayesian framework, determining a distribution over the set of allowed models) that minimizes the cost criterion (i.e., the error value calculated using the error/loss function). Generally, the ANN can be trained using any of the numerous algorithms for training neural network models (e.g., by applying optimization theory and statistical estimation).

For example, the optimization method used in training artificial neural networks can use some form of gradient descent, using backpropagation to compute the actual gradients. This is done by taking the derivative of the cost function with respect to the network parameters and then changing those parameters in a gradient-related direction. The backpropagation training algorithm can be: a steepest descent method (e.g., with variable learning rate, with variable learning rate and momentum, and resilient backpropagation), a quasi-Newton method (e.g., Broyden-Fletcher-Goldfarb-Shannon, one step secant, and Levenberg-Marquardt), or a conjugate gradient method (e.g., Fletcher-Reeves update, Polak-Ribiére update, Powell-Beale restart, and scaled conjugate gradient). Additionally, evolutionary methods, such as gene expression programming, simulated annealing, expectation-maximization, non-parametric methods, and particle swarm optimization, can also be used for training the ML method 410.

The training 408 of the ML method 410 can also include various techniques to prevent overfitting to the training data 402 and for validating the trained ML method 410. For example, bootstrapping and random sampling of the training data 402 can be used during training.

In addition to supervised learning used to initially train the ML method 410, the ML method 410 can be continuously trained while being used by using reinforcement learning based on the network measurements and the corresponding configurations used on the network. The ML method 410 can be cloud-based and trained using network measurements and the corresponding configurations from other networks that provide feedback to the cloud.

Further, other machine learning (ML) algorithms can be used for the ML method 410, and the ML method 410 is not limited to being an ANN. For example, there are many machine-learning models, and the ML method 410 can be based on machine-learning systems that include generative adversarial networks (GANs) that are trained, for example, using pairs of network measurements and their corresponding optimized configurations.

As understood by those of skill in the art, machine-learning-based classification techniques can vary depending on the desired implementation. For example, machine-learning classification schemes can utilize one or more of the following, alone or in combination: hidden Markov models, recurrent neural networks (RNNs), convolutional neural networks (CNNs); Deep Learning networks, Bayesian symbolic methods, general adversarial networks (GANs), support vector machines, image registration methods, and/or applicable rule-based systems. Where regression algorithms are used, they can include but are not limited to: Stochastic Gradient Descent Regressors, and/or Passive Aggressive Regressors, etc.

Machine learning classification models can also be based on clustering algorithms (e.g., a Mini-batch K-means clustering algorithm), a recommendation algorithm (e.g., a Mini-wise Hashing algorithm, or Euclidean Locality-Sensitive Hashing (LSH) algorithm), and/or an anomaly detection algorithm, such as a Local outlier factor. Additionally, machine-learning models can employ a dimensionality reduction approach, such as, one or more of: a Mini-batch Dictionary Learning algorithm, an Incremental Principal Component Analysis (PCA) algorithm, a Latent Dirichlet Allocation algorithm, and/or a Mini-batch K-means algorithm, etc.

Figure 4B:
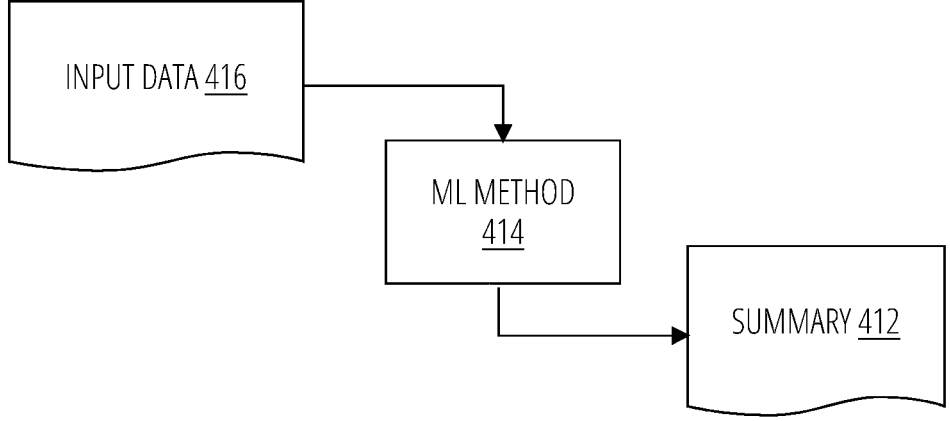
FIG. 4B illustrates a flow diagram for an example of a method of using the trained neural network in accordance with some embodiments of the present technology.

FIG. 4B illustrates an example of using the trained ML method 410. The input data 416 are applied to the trained ML method 410 to generate the outputs, which can include the summary 412.

FIG. 5 illustrates an example process 500 to determine configuration correlations of a plurality of network services according to some aspects of the present technology. Although the example process 500 depicts a particular sequence of operations, the sequence may be altered without departing from the scope of the present disclosure. For example, some of the operations depicted may be performed in parallel or in a different sequence that does not materially affect the function of the process 500. In other examples, different components of an example device or system that implements the process 500 may perform functions at substantially the same time or in a specific sequence.

In the constantly evolving world of enterprise networking, ensuring consistent configuration policies across multiple network services combines the benefits of stable connectivity, network security, and the efficient allocation of network resources, creating a harmonious network environment. For instance, imagine an enterprise that depends on a complex network infrastructure spread out across a vast network environment. To ensure smooth operations, the enterprise must seamlessly integrate various services like cloud applications, security measures, and VoIP communication systems. Harmonizing configurations in such a context guarantees optimal resource allocation, a QoS for video conferencing and other applications, and a unified security strategy to safeguard sensitive data. An example process 500 is described below, along with one or more embodiments of the disclosed technology, which allow enterprises to ensure network services are able to achieve interoperable operations between each other within the network.

In block 502, process 500 receives configuration information from one or more network services in a network, the configuration information including configuration descriptions of rules configured on respective services. For example, the controller 106 in FIG. 1, may receiving configuration information via a request for a network configuration policy for a plurality of network devices 104. The request can include configuration information and network settings associated with the plurality of network devices 104. The configuration information in some cases consists of descriptions of rules that are configured on various services. Additionally, the configuration information can be organized into one or more application-based categories that correspond to the functionalities of the network services.

Further, the process comprises utilizing application programming interfaces (APIs) to retrieve a plurality of configuration policies from controllers associated with each of the plurality of network services. For example, the controller 106 illustrated in FIG. 1, may utilize APIs to retrieve a plurality of configuration policies from controllers associated with each of the plurality of network services such as the Gateway 108, DNS 110, DLP 112, or Firewall 114.

In an enterprise network, the orchestration of multiple network services can rely on the seamless integration of configuration policies through Application Programming Interfaces (APIs). For example, the network's central management system can utilize APIs to connect with various controllers associated with each network service. For instance, there may be a controller for cloud services, another for content delivery, and yet another for security measures. Using APIs, the central management system can retrieve a plethora of configuration policies from each of these controllers. These configuration policies encompass intricate details, including descriptions of rules configured on each respective service. This comprehensive data retrieval ensures that all network services operate harmoniously, aligning their settings, security protocols, and QoS configurations to create a unified and efficient network environment. Through the integration of APIs, the enterprise gains control, flexibility, and the ability to fine-tune network policies across various services to meet specific enterprise needs and optimize performance of the overall network.

In some examples, the process 500 comprises training a Large Language Model (LLM) to recognize and analyze rules within each configuration policy. For example, the controller 106 illustrated in FIG. 1 may recognize and analyze rules within each configuration policy. In some examples, the controller 106 is configured to group a set of rules from each of the configuration policies based on one or more similarities identified from the plurality of network devices serving the network.

In the instance, of an enterprise network, the controller 106, equipped with a policy management service, can communicate with each network service's (Gateway 108, DNS 110, DLP 112, Firewall 114) controller through APIs, retrieving a multitude of configuration policies. These policies can contain an array of rules and settings that govern each network service and their applicability to the network device 104 in the network. In some examples, the controller 106 can task the policy management service to recognize and analyze the rules embedded within each configuration policy. This entails comprehending the intricacies of firewall settings, access control, and QoS configurations specific to each service.

Additionally, the controller 106 illustrated in FIG. 1 is configured to intelligently group a set of rules from each configuration policy based on similarities it identifies. This grouping ensures that rules with akin objectives or parameters are consolidated, simplifying management, and facilitating cross-service alignment. For example, rules governing data access permissions may be grouped together, allowing for consistent access control policies across the network. The LLM's ability to identify rule similarities enables a harmonized network environment.

In block 504, process 500 can analyze the configuration information for the one or more network services to identify the rules on the respective services that have similar intents. For example, the controller 106 illustrated in FIG. 1 may analyze the configuration information for the one or more network services to identify the rules on the respective services that have similar intents. The configuration information from multiple network services can be imported into a centralized configuration dataset. This allows for identifying correlations between the services based on similarities in functionality, intent, and the associated configuration policy's rules. For example, the controller 106 illustrated in FIG. 1 may identify correlations between the respective services that have similar intents in the group based on the unified configuration dataset. In some examples, the correlations identify similarities between the identified rules.

Additionally, the process 500 can further involve creating a refreshed configuration that can be displayed across one or more devices linked with the network services. For instance, the controller 106 illustrated in FIG. 1 can generate a refreshed configuration to be displayed across one or more administrator devices 102 related to the network services 108, 110, 112, 114. In some examples, the refreshed configuration can further include identifying correlations in a unified recommendation.

For example, an analytics engine associated with the controller 106 is tasked with analyzing the configuration information from each network service. The controller 106 can extract detailed configuration policies, which consist of a multitude of rules governing aspects like access control, and security protocols. These configuration policies are then imported into a centralized configuration dataset. By centralizing the configuration information, the controller 106 has a comprehensive view of the organization's entire network environment. It can then dive deep into the dataset to identify correlations between the network services based on similarities in functionality, intent, and the rules defined in the associated configuration policies.

For instance, the analytics engine controller 106 may recognize commonalities in access control rules across different services, identifying shared intentions of providing secure, role-based access to resources. It may also spot congruences in QoS settings, ensuring that real-time communication services receive consistent high-priority treatment. Through this analysis, the organization gains valuable insights into how its network services align in functionality and intent. It can then utilize these findings to harmonize configurations, making the network more efficient, secure, and better tailored to its specific business needs. This approach not only optimizes network performance but also streamlines management and bolsters the organization's ability to adapt and innovate in the ever-evolving landscape of modern networking.

In block 506, process 500 presents the identified rules on the respective services that have similar intents together in a group in a user interface. For example, the controller 106 illustrated in FIG. 1 may present the identified rules on the respective services to the administrator device 102 that have similar intents together in a group in a user interface.

For example, the controller 106 can present the identified rules together to the administrator device 102 for display in a user interface, creating a distinct group for each shared intent. In this case, it might group all the firewall rules related to blocking malicious traffic in one section of the user interface. This approach simplifies the management of these rules, allowing administrators to apply consistent security policies across the network more efficiently. By clustering rules with similar intents, the control plane ensures that administrators can focus on overarching security objectives, rather than dealing with isolated configurations for each device or service.

In block 508, process 500 receives an input to expand the group of the identified rules, wherein respective rules of the identified rules are presented in a normalized manner to facilitate easy comparison. For example, the controller 106 illustrated in FIG. 1 may receive an input to expand the group of the identified rules. In some examples, respective rules of the identified rules are presented in a normalized manner to facilitate easy comparison.

In block 510, process 500 in response to identifying a similar rule to the identified rules, presents the similar rule proximate to the group of the identified rules with a suggestion to modify the similar rule to correspond to the identified rules. For example, the administrator device 102 illustrated in FIG. 1 may present the similar rule proximate to the group of the identified rules with a suggestion to modify the similar rule to correspond to the identified rules.

In block 512, process 500 determines a configuration update for one of the network services on which the similar rule is configured to apply a change to the similar rule that will make the similar rule correspond to the identified rules. For example, the controller 106 illustrated in FIG. 1 may determine a configuration update for one of the network services on which the similar rule is configured to apply a change to the similar rule that will make the similar rule correspond to the identified rules. In some examples, the configuration update includes an indication of how rules included within the configuration update are configured and specifies their intended functionality and application.

Further, the process comprises assigning a relevance level to the configuration updates with respect to the plurality of network services. For example, the controller 106 illustrated in FIG. 1 may assign a relevance level to the configuration updates with respect to the plurality of network services.

In some examples, the process 500 further includes evaluating the relevance levels assigned to one or more configuration updates in relation to other groups of rules. For example, the controller 106 illustrated in FIG. 1 may manage the configuration policies of the network service by evaluating the relevance levels assigned to one or more configuration updates in relation to other groups of rules. In some examples, a group of rules with a higher relevance level is considered more critical to the operations of the network service.

For example, to ensure optimal performance during high-demand shopping seasons, the analytics engine plays a crucial role in assessing the relevance of various configuration updates. Configuration updates can include rules related to service scalability, content caching, and DDOS protection. Each update is assigned a relevance level based on its importance in maintaining smooth e-commerce operations. The analytics engine evaluates the relevance levels within different rule groups and identifies that the group of rules associated with load balancing and content delivery has a higher relevance level compared to the group of rules focused on DDOS mitigation. This understanding allows the platform to prioritize resources, implement changes effectively, and maintain uninterrupted website availability and fast content delivery.

Further, the process comprises removing at least one configuration update upon determining that there are groups of rules with higher relevance levels than another group of rules. For example, the controller 106 illustrated FIG. 1 through a policy management service may remove at least one configuration update upon determining that there are groups of rules with higher relevance levels than another group of rules.

For example, during its evaluation, the system identifies that a group of rules pertaining to data access policies and content delivery optimizations has been consistently assigned higher relevance levels compared to another group related to security protocols. Given this insight, the network management system decides to streamline its approach. It realizes that some of the configuration updates within the security protocol group can be cumbersome and occasionally lead to network disruptions. In response, the network management system can choose to remove at least one configuration update within the security protocol group to prioritize network efficiency and customer satisfaction. By doing so, it ensures that the rules associated with higher relevance levels are at the forefront, promoting optimal network performance and aligning the configuration updates with the organization's primary operational objectives.

Further, the process comprises transmitting the configuration updates along with the relevance levels to each of the plurality of network services in a network. For example, the controller 106 illustrated in FIG. 1 may transmit the configuration updates along with the relevance levels to each of the plurality of network services in a network. In some examples, the relevance levels are associated with a context-aware implementation of configuration updates tailored to each service's requirements and priorities.

In block 514, process 500 can include transmitting the configuration updates to each of the plurality of network services in a network. For example, the controller 106 illustrated in FIG. 1 may transmit the configuration updates to each of the plurality of network services in a network.

For example, the network management system can recognize that certain changes to data access policies are of utmost importance, given the organization's extensive data management. These updates have a high relevance level, as they impact core enterprise operations. Simultaneously, the network management system identifies a group of updates related to security protocols that require immediate attention due to their significance in safeguarding the network against potential threats.

Having made these determinations, the network management system can proceed to generate updated network configurations, and tailor these configurations to ensure that the rules and policies align with the established priorities, focusing on the highest relevance and significance levels. Once the updated configurations are finalized, the system efficiently transmits them to all the network controllers associated with the various network services. These controllers oversee everything from access control and content delivery to security protocols, and they eagerly await the refreshed configurations.

This streamlined approach ensures that all network services are synchronized, and the configuration updates are seamlessly integrated across the network, minimizing disruptions, and bolstering performance. As a result, the multinational corporation maintains a high-performing, secure network environment capable of meeting the demands required of the enterprise network.

Figure 6:
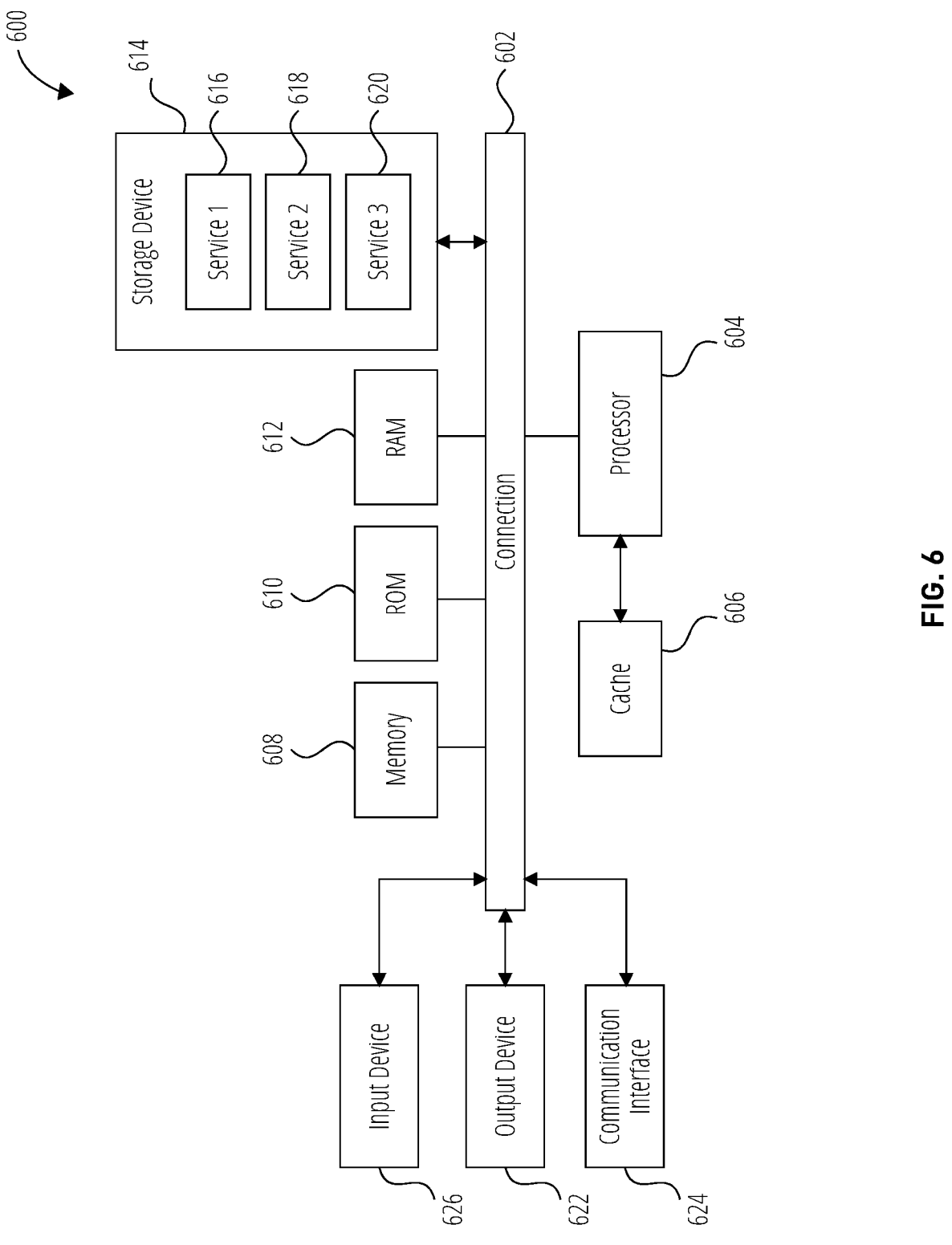
FIG. 6 illustrates a block diagram for an example of a computing device in accordance with some embodiments of the present technology.

FIG. 6 shows an example of computing system 600, which can be for example any computing device making up the system network 104 of FIG. 6, or any component thereof in which the components of the system are in communication with each other using connection 602. Connection 602 can be a physical connection via a bus, or a direct connection into processor 604, such as in a chipset architecture. Connection 602 can also be a virtual connection, networked connection, or logical connection.

In some embodiments, computing system 600 is a distributed system in which the functions described in this disclosure can be distributed within a datacenter, multiple data centers, a peer network, etc. In some embodiments, one or more of the described system components represents many such components each performing some or all the function for which the component is described. In some embodiments, the components can be physical or virtual devices.

Example computing system 600 includes at least one processing unit (central processing unit (CPU) or processor) 604 and connection 602 that couples various system components including system memory 608, such as read-only memory (ROM) 610 and random-access memory (RAM) RAM 612 to processor 604. Computing system 600 can include a cache of high-speed memory 608 connected directly with, in close proximity to, or integrated as part of processor 604.

Processor 604 can include any general-purpose processor and a hardware service or software service, such as services 616, 618, and 620 stored in storage device 614, configured to control processor 604 as well as a special-purpose processor where software instructions are incorporated into the actual processor design. Processor 604 may essentially be a completely self-contained computing system, containing multiple cores or processors, a bus, memory controller, cache, etc. A multi-core processor may be symmetric or asymmetric.

To enable user interaction, computing system 600 includes an input device 626, which can represent any number of input mechanisms, such as a microphone for speech, a touch-sensitive screen for gesture or graphical input, keyboard, mouse, motion input, speech, etc. Computing system 600 can also include output device 622, which can be one or more of a number of output mechanisms known to those of skill in the art. In some instances, multimodal systems can enable a user to provide multiple types of input/output to communicate with computing system 600. Computing system 600 can include communication interface 624, which can generally govern and manage the user input and system output. There is no restriction on operating on any particular hardware arrangement, and therefore the basic features here may easily be substituted for improved hardware or firmware arrangements as they are developed.

Storage device 614 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read-only memory (ROM), and/or some combination of these devices.

The storage device 614 can include software services, servers, services, etc., that when the code that defines such software is executed by the processor 604, it causes the system to perform a function. In some embodiments, a hardware service that performs a particular function can include the software component stored in a computer-readable medium in connection with the hardware components, such as processor 604, connection 600, output device 620, etc., to carry out the function.

For clarity of explanation, in some instances, the present technology may be presented as including individual functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in the memory of a client device and/or one or more servers of a content management system and performs one or more functions when a processor executes the software associated with the service. In some embodiments, a service is a program or a collection of programs that carry out a specific function. In some embodiments, a service can be considered a server. The memory can be a non-transitory computer-readable medium.

In some embodiments, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer-readable media. Such instructions can comprise, for example, instructions and data that cause or otherwise configure a general-purpose computer, special-purpose computer, or special-purpose processing device to perform a certain function or group of functions. Portions of computer resources used can be accessible over a network. The computer-executable instructions may be, for example, binaries, intermediate format instructions such as assembly language, firmware, or source code. Examples of computer-readable media that may be used to store instructions, information used, and/or information created during methods according to described examples include magnetic or optical disks, solid-state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smart phones, small form factor personal computers, personal digital assistants, and so on. Functionality described herein can also be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Some aspects of the present technology include:

Aspect 1. A method to determine configuration correlations of a plurality of network services, the method comprising: receiving configuration information from one or more network services in a network, the configuration information including configuration descriptions of rules configured on respective services; analyzing the configuration information for the one or more network services to identify the rules on the respective services that have similar intents; presenting the identified rules on the respective services that have similar intents together in a group in a user interface; receiving an input to expand the group of the identified rules, wherein respective rules of the identified rules are presented in a normalized manner to facilitate easy comparison; in response to identifying a similar rule to the identified rules, presenting the similar rule proximate to the group of the identified rules with a suggestion to modify the similar rule to correspond to the identified rules; determining a configuration update for one of the network services on which the similar rule is configured to apply a change to the similar rule that will make the similar rule correspond to the identified rules; and transmitting the configuration updates to each of the plurality of network services in a network.

Aspect 2. The method of Aspect 1, further comprising: importing the configuration information from the plurality of network services into a unified configuration dataset; identifying correlations between the respective services that have similar intents in the group based on the unified configuration dataset, wherein the correlations identify similarities between the identified rules; and generating an updated configuration for display across one or more devices associated with the network services, wherein the updated configuration incorporate the identified correlations in a single recommendation.

Aspect 3. The method of any of Aspects 1 to 2, further comprising: utilizing application programming interfaces (APIs) to retrieve a plurality of configuration policies from controllers associated with each of the plurality of network services; training a Large Language Model (LLM) to recognize and analyze rules within each configuration policy, wherein the LLM is configured to group a set of rules from each of the configuration policies based on one or more similarities identified; and transmitting the grouped set of rules and configuration update recommendations to each of the controllers for implementation at the respective network services.

Aspect 4. The method of any of Aspects 1 to 3, wherein the configuration update includes an indication of how rules included within the configuration update are configured and specifies their intended functionality and application.

Aspect 5. The method of any of Aspects 1 to 4, further comprising: assigning a relevance level to the configuration updates with respect to the plurality of network services, indicating a significance level of the update for each service; and transmitting the configuration updates along with the relevance levels to each of the plurality of network services in a network, wherein the relevance levels are associated with a context-aware implementation of configuration updates tailored to each service's requirements and priorities.

Aspect 6. The method of any of Aspects 1 to 5, further comprising: evaluating the relevance levels assigned to one or more configuration updates in relation to other groups of rules, wherein a group of rules with a higher relevance level is considered more critical to operations of the network service; and removing at least one configuration update upon determining that there are groups of rules with higher relevance levels than another group of rules.

Aspect 7. The method of any of Aspects 1 to 6, further comprising: classifying the configuration information obtained from each of the one or more network services; and grouping the configuration information into one or more groups based on a similarity comparison, wherein the one or more groups includes shared intents, functions, and applications of the configuration information within the network.

Aspect 8. The method of any of Aspects 1 to 7, further including receiving a request from a client device requesting the generation of an updated configuration policy for the one or more network services in the network, the request including one or more network configurations, retrieving the configuration information from the one or more network services, where the configuration information identifies current network configurations for each network services, and identifying updated network configurations to include in the updated configuration policy, where the updated network configurations have a plurality of correlations, transmitting the updated configuration policy including the updated network configurations for display at the client device. Other technical features may be readily apparent to one skilled in the art from the following figures, descriptions, and claims.

Aspect 9. A network device comprising: one or more memories having computer-readable instructions stored therein; and one or more processors configured to execute the computer-readable instructions to: receive configuration information from one or more network services in a network, the configuration information including configuration descriptions of rules configured on respective services; analyze the configuration information for the one or more network services to identify the rules on the respective services that have similar intents; present the identified rules on the respective services that have similar intents together in a group in a user interface; receive an input to expand the group of the identified rules, wherein respective rules of the identified rules are presented in a normalized manner to facilitate easy comparison; in response to identifying a similar rule to the identified rules, present the similar rule proximate to the group of the identified rules with a suggestion to modify the similar rule to correspond to the identified rules; determine a configuration update for one of the network services on which the similar rule is configured to apply a change to the similar rule that will make the similar rule correspond to the identified rules; and transmit the configuration updates to each of the plurality of network services in a network.

Aspect 10. The network device of Aspect 8, further comprising: importing the configuration information from the plurality of network services into a unified configuration dataset; identifying correlations between the respective services that have similar intents in the group based on the unified configuration dataset, wherein the correlations identify similarities between the identified rules; and generating an updated configuration for display across one or more devices associated with the network services, wherein the updated configuration incorporate the identified correlations in a single recommendation.

Aspect 11. The network device of any of Aspects 8 to 9, further comprising: utilizing application programming interfaces (APIs) to retrieve a plurality of configuration policies from controllers associated with each of the plurality of network services; training a Large Language Model (LLM) to recognize and analyze rules within each configuration policy, wherein the LLM is configured to group a set of rules from each of the configuration policies based on one or more similarities identified; and transmitting the grouped set of rules and configuration update recommendations to each of the controllers for implementation at the respective network services.

Aspect 12. The network device of any of Aspects 8 to 10, wherein the configuration update includes an indication of how rules included within the configuration update are configured and specifies their intended functionality and application.

Aspect 13. The network device of any of Aspects 8 to 11, further comprising: assigning a relevance level to the configuration updates with respect to the plurality of network services, indicating a significance level of the update for each service; and transmitting the configuration updates along with the relevance levels to each of the plurality of network services in a network, wherein the relevance levels are associated with a context-aware implementation of configuration updates tailored to each service's requirements and priorities.

Aspect 14. The network device of any of Aspects 8 to 12, further comprising: evaluating the relevance levels assigned to one or more configuration updates in relation to other groups of rules, wherein a group of rules with a higher relevance level is considered more critical to operations of the network service; and removing at least one configuration update upon determining that there are groups of rules with higher relevance levels than another group of rules.

Aspect 15. The network device of any of Aspects 8 to 13, further comprising: classifying the configuration information obtained from each of the one or more network services; and grouping the configuration information into one or more groups based on a similarity comparison, wherein the one or more groups includes shared intents, functions, and applications of the configuration information within the network.

Aspect 16. A non-transitory computer-readable storage medium comprising computer-readable instructions, which when executed by one or more processors of a network appliance, cause the network appliance to: receive configuration information from one or more network services in a network, the configuration information including configuration descriptions of rules configured on respective services; analyze the configuration information for the one or more network services to identify the rules on the respective services that have similar intents; present the identified rules on the respective services that have similar intents together in a group in a user interface; receive an input to expand the group of the identified rules, wherein respective rules of the identified rules are presented in a normalized manner to facilitate easy comparison; in response to identifying a similar rule to the identified rules, present the similar rule proximate to the group of the identified rules with a suggestion to modify the similar rule to correspond to the identified rules; determine a configuration update for one of the network services on which the similar rule is configured to apply a change to the similar rule that will make the similar rule correspond to the identified rules; and transmit the configuration updates to each of the plurality of network services in a network.

Aspect 17. The non-transitory computer-readable storage medium of Aspect 15, wherein the one or more processors are further configured to: import the configuration information from the plurality of network services into a unified configuration dataset; identify correlations between the respective services that have similar intents in the group based on the unified configuration dataset, wherein the correlations identify similarities between the identified rules; and generate an updated configuration for display across one or more devices associated with the network services, wherein the updated configuration incorporates the identified correlations in a single recommendation.

Aspect 18. The non-transitory computer-readable storage medium of any of Aspects 15 to 16, wherein the one or more processors are further configured to: utilize application programming interfaces (APIs) to retrieve a plurality of configuration policies from controllers associated with each of the plurality of network services; train a Large Language Model (LLM) to recognize and analyze rules within each configuration policy, wherein the LLM is configured to group a set of rules from each of the configuration policies based on one or more similarities identified; and transmit the grouped set of rules and configuration update recommendations to each of the controllers for implementation at the respective network services.

Aspect 19. The non-transitory computer-readable storage medium of any of Aspects 15 to 17, wherein the configuration update includes an indication of how rules included within the configuration update are configured and specifies their intended functionality and application.

Aspect 20. The non-transitory computer-readable storage medium of any of Aspects 15 to 18, wherein the one or more processors are further configured to: assign a relevance level to the configuration updates with respect to the plurality of network services, indicating a significance level of the update for each service; and transmit the configuration updates along with the relevance levels to each of the plurality of network services in a network, wherein the relevance levels are associated with a context-aware implementation of configuration updates tailored to each service's requirements and priorities.

Aspect 21. The non-transitory computer-readable storage medium of any of Aspects 15 to 19, wherein the one or more processors are further configured to: evaluate the relevance levels assigned to one or more configuration updates in relation to other groups of rules, wherein a group of rules with a higher relevance level is considered more critical to operations of the network service; and remove at least one configuration update upon determining that there are groups of rules with higher relevance levels than another group of rules.

What is claimed is:

1. A method to determine configuration correlations of a plurality of network services, the method comprising:

receiving configuration information from one or more network services in a network, the configuration information including configuration descriptions of rules configured on respective services;

analyzing the configuration information for the one or more network services to identify the rules on the respective services that have similar intents;

presenting the identified rules on the respective services that have similar intents together in a group in a user interface;

receiving an input to expand the group of the identified rules, wherein respective rules of the identified rules are presented in a normalized manner to facilitate easy comparison;

in response to identifying a similar rule to the identified rules, presenting the similar rule proximate to the group of the identified rules with a suggestion to modify the similar rule to correspond to the identified rules;

determining a configuration update for one of the network services on which the similar rule is configured to apply a change to the similar rule that will make the similar rule correspond to the identified rules; and transmitting the configuration update to each of the plurality of network services in a network.

2. The method of claim 1, further comprising:

importing the configuration information from the plurality of network services into a unified configuration dataset;

identifying correlations between the respective services that have similar intents in the group based on the unified configuration dataset, wherein the correlations identify similarities between the identified rules; and generating an updated configuration for display across one or more devices associated with the plurality of network services, wherein the updated configuration incorporate the identified correlations in a single recommendation.

3. The method of claim 1, further comprising:

utilizing application programming interfaces (APIs) to retrieve a plurality of configuration policies from controllers associated with each of the plurality of network services;

training a Large Language Model (LLM) to recognize and analyze rules within each configuration policy, wherein the LLM is configured to group a set of rules from each of the configuration policies based on one or more similarities identified; and transmitting the grouped set of rules and configuration update recommendations to each of the controllers for implementation at the respective network services.

4. The method of claim 1, wherein the configuration update includes an indication of how rules included within the configuration update are configured and specifies their intended functionality and application.

5. The method of claim 1, further comprising:

assigning a relevance level to the configuration update with respect to the plurality of network services, indicating a significance level of the update for each service; and transmitting the configuration update along with the relevance level to each of the plurality of network services in a network, wherein the relevance level are associated with a context-aware implementation of configuration update tailored to each service's requirements and priorities.

6. The method of claim 5, further comprising:

evaluating the relevance level assigned to one or more configuration update in relation to other groups of rules, wherein a group of rules with a higher relevance level is considered more critical to operations of the network service; and removing at least one configuration update upon determining that there are groups of rules with higher relevance level than another group of rules.

7. The method of claim 1, further comprising:

classifying the configuration information obtained from each of the one or more network services; and grouping the configuration information into one or more groups based on a similarity comparison, wherein the one or more groups includes shared intents, functions, and applications of the configuration information within the network.

8. The method of claim 1, further comprising:

receiving a request from a client device requesting generation of an updated configuration policy for the one or more network services in the network, the request including one or more network configurations;

retrieving the configuration information from the one or more network services, wherein the configuration information identifies current network configurations for each network services;

identifying updated network configurations to include in the updated configuration policy, wherein the updated network configurations have a plurality of correlations; and transmitting the updated configuration policy including the updated network configurations for display at the client device.

9. A network device comprising:

one or more memories having computer-readable instructions stored therein; and one or more processors configured to execute the computer-readable instructions to:

receive configuration information from one or more network services in a network, the configuration information including configuration descriptions of rules configured on respective services;

analyze the configuration information for the one or more network services to identify the rules on the respective services that have similar intents;

present the identified rules on the respective services that have similar intents together in a group in a user interface;

receive an input to expand the group of the identified rules, wherein respective rules of the identified rules are presented in a normalized manner to facilitate easy comparison;

in response to identifying a similar rule to the identified rules, present the similar rule proximate to the group of the identified rules with a suggestion to modify the similar rule to correspond to the identified rules;

determine a configuration update for one of the plurality of network services on which the similar rule is configured to apply a change to the similar rule that will make the similar rule correspond to the identified rules; and transmit the configuration update to each of the plurality of network services in a network.

10. The network device of claim 9, further comprising:
importing the configuration information from the plurality of network services into a unified configuration dataset;

identifying correlations between the respective services that have similar intents in the group based on the unified configuration dataset, wherein the correlations identify similarities between the identified rules; and generating an updated configuration for display across one or more devices associated with the plurality of network services, wherein the updated configuration incorporate the identified correlations in a single recommendation.

11. The network device of claim 9, further comprising:
utilizing application programming interfaces (APIs) to retrieve a plurality of configuration policies from controllers associated with each of the plurality of network services;

training a Large Language Model (LLM) to recognize and analyze rules within each configuration policy, wherein the LLM is configured to group a set of rules from each of the configuration policies based on one or more similarities identified; and transmitting the grouped set of rules and configuration update recommendations to each of the controllers for implementation at the respective network services.

12. The network device of claim 9, wherein the configuration update includes an indication of how rules included within the configuration update are configured and specifies their intended functionality and application.

13. The network device of claim 9, further comprising:
assigning a relevance level to the configuration update with respect to the plurality of network services, indicating a significance level of the update for each service; and transmitting the configuration update along with the relevance level to each of the plurality of network services in a network, wherein the relevance level are associated with a context-aware implementation of configuration update tailored to each service's requirements and priorities.

14. The network device of claim 13, further comprising:
evaluating the relevance level assigned to one or more configuration update in relation to other groups of rules, wherein a group of rules with a higher relevance level is considered more critical to operations of the plurality of network services; and removing at least one configuration update upon determining that there are groups of rules with higher relevance level than another group of rules.

15. The network device of claim 9, further comprising:
classifying the configuration information obtained from each of the one or more network services; and grouping the configuration information into one or more groups based on a similarity comparison, wherein the one or more groups includes shared intents, functions, and applications of the configuration information within the network.

16. A non-transitory computer-readable storage medium comprising computer-readable instructions, which when executed by one or more processors of a network appliance, cause the network appliance to:

receive configuration information from one or more network services in a network, the configuration information including configuration descriptions of rules configured on respective services;

analyze the configuration information for the one or more network services to identify the rules on the respective services that have similar intents;

present the identified rules on the respective services that have similar intents together in a group in a user interface;

receive an input to expand the group of the identified rules, wherein respective rules of the identified rules are presented in a normalized manner to facilitate easy comparison;

in response to identifying a similar rule to the identified rules, present the similar rule proximate to the group of the identified rules with a suggestion to modify the similar rule to correspond to the identified rules;

determine a configuration update for one of the plurality of network services on which the similar rule is configured to apply a change to the similar rule that will make the similar rule correspond to the identified rules; and transmit the configuration update to each of the plurality of network services in a network.

17. The non-transitory computer-readable storage medium of claim 16, wherein the one or more processors are further configured to:
import the configuration information from the plurality of network services into a unified configuration dataset;

identify correlations between the respective services that have similar intents in the group based on the unified configuration dataset, wherein the correlations identify similarities between the identified rules; and generate an updated configuration for display across one or more devices associated with the plurality of network services, wherein the updated configuration incorporates the identified correlations in a single recommendation.

18. The non-transitory computer-readable storage medium of claim 16, wherein the one or more processors are further configured to:

utilize application programming interfaces (APIs) to retrieve a plurality of configuration policies from controllers associated with each of the plurality of network services;

train a Large Language Model (LLM) to recognize and analyze rules within each configuration policy, wherein the LLM is configured to group a set of rules from each of the configuration policies based on one or more similarities identified; and transmit the grouped set of rules and configuration update recommendations to each of the controllers for implementation at the respective network services.

19. The non-transitory computer-readable storage medium of claim 16, wherein the one or more processors are further configured to:

assign a relevance level to the configuration update with respect to the plurality of network services, indicating a significance level of the update for each service; and transmit the configuration update along with the relevance level to each of the plurality of network services in a network, wherein the relevance level are associated with a context-aware implementation of configuration update tailored to each service's requirements and priorities.

20. The non-transitory computer-readable storage medium of claim 16, wherein the one or more processors are further configured to:

evaluate the relevance level assigned to one or more configuration update in relation to other groups of rules, wherein a group of rules with a higher relevance level is considered more critical to operations of the plurality of network services; and remove at least one configuration update upon determining that there are groups of rules with higher relevance level than another group of rules.

* * * * *